United States Patent [19]

Ohno

[11] Patent Number: 4,713,590
[45] Date of Patent: Dec. 15, 1987

[54] CONTROL CIRCUIT FOR DC BRUSHLESS MOTOR PRODUCING CONSTANT OUTPUT TORQUE

[75] Inventor: Hirotoshi Ohno, Sagamihara, Japan

[73] Assignee: Victor Company of Japan, Japan

[21] Appl. No.: 836,626

[22] Filed: Mar. 5, 1986

[30] Foreign Application Priority Data

Mar. 7, 1985 [JP] Japan .................................. 60-45240

[51] Int. Cl.$^4$ ............................................. H02P 6/02
[52] U.S. Cl. .................................. 318/254; 318/138; 318/439
[58] Field of Search ......................... 318/138, 254, 439

[56] References Cited

U.S. PATENT DOCUMENTS

| | | | |
|---|---|---|---|
| 3,165,685 | 1/1965 | Manteuffel et al. | 318/138 |
| 3,839,661 | 10/1974 | Wada | 318/138 |
| 4,442,386 | 4/1984 | Uchida et al. | 318/254 |
| 4,455,514 | 6/1984 | Ohno | 318/138 X |
| 4,494,052 | 1/1985 | Kelleher et al. | 318/254 |
| 4,546,294 | 10/1985 | Ban et al. | 318/138 X |

FOREIGN PATENT DOCUMENTS 2067369 7/1981 United Kingdom

*Primary Examiner*—William M. Shoop, Jr.
*Assistant Examiner*—Bentsu Ro
*Attorney, Agent, or Firm*—Lowe, Price, LeBlanc, Becker & Shur

[57] ABSTRACT

A control circuit for controlling a multi-phase brushless DC motor to produce a constant level of torque employs one Hall generator for each pair of armature windings corresponding to a motor phase, with each Hall generator being arranged to produce output signals whose timings determine the respective timings of switching of current to the armature windings and whose amplitudes are detected to produce a signal representing motor torque. This is achieved by passing currents through each Hall generator which are held proportional to currents flowing in the corresponding armature windings, so that the amplitudes of output voltage signals produced by the Hall generators represent the product of magnetic flux density of field magnet flux linked to the armature windings and armature winding current, and so are proportional to the torque.

18 Claims, 23 Drawing Figures

CONTROL CIRCUIT FOR DC BRUSHLESS MOTOR PRODUCING CONSTANT OUTPUT TORQUE

BACKGROUND OF THE INVENTION

The present invention relates to a control circuit for controlling the operation of a brushless DC motor to produce a constant level of output torque.

Due to the improvements which have been made in the characteristics of DC motors, these are being increasingly widely utilized as servomotors in a wide variety of equipment, in various fields of applications. In particular, this is true of brushless DC motors which employ non-contact magnetic field sensing means and electronic switching circuits to perform switching of armature current, rather than the conventional commutator. More specifically, such a DC brushless motor generally consists of a plurality of armature windings, a rotor including a permanently magnetized field magnet having a plurality of magnetic poles, such a rotor being referred to hereinafter as a magnetorotor, magnetic field sensors for sensing the current positions of the magnetic poles of the magnetorotor with respect to the stator windings, and an armature winding current supply circuit, i.e an electronic circuits for performing appropriate switching control of the armature winding currents in response to signals from the magnetic field sensors. for controlling the motor torque.

However the torque which is produced by a brushless DC motor is proportional to the product of the level of current flowing in the armature windings and the amount of magnetic flux of the field magnets of the magnetorotor that is linked to the armature windings. If the waveforms of the currents which flow in the armature windings are not accurately related to the distribution of magnetic flux produced by the field magnets of the magnetorotor such that this product of magnetic flux and current is constant, then periodic variations (pulsations) of the torque produced by the motor will occur, i.e. torque ripple will be generated. Due to this, the motor will not rotate in a precisely stable manner, and wow, flutter, jitter and vibration will result.

FIG. 1 is a torque generation block diagram of an example of a prior art current feedback 4-input 2-phase brushless DC motor. In FIG. 1, Vt represents a torque control voltage whose level can be adjusted to produce a required level of output torque, I denotes the motor drive current, T denotes the generated torque, and Vi denotes a current sensing voltage, while A denotes an adder. A differential voltage (Vt−Vi) is produced from the adder A. Block G denotes an amplifier which amplifies the differential voltage (Vt−Vi) from the adder A and converts this into a motor drive current I. $\phi$ denotes the process whereby the motor converts the magnetic flux $\phi$ of the motor field and the motor drive current I into a level of torque T. Block R denotes a voltage detector which converts the motor drive current I into a current sensing voltage Vi. Block A' denotes an adder, and block T' denotes torque ripple that is generated by the motor. This torque ripple from block T' is added to the torque from the motor block $\phi$ in adder A', to thereby produce the output torque T. FIG. 2 is a circuit diagram of an example of a prior art type of current feedback 4-input 2-phase brushless DC motor, whereby torque is generated by the process illustrated in FIG. 1. FIG. 3 is a cross-sectional view in elevation of a brushless DC motor, whose body is generally shaped as a flat disc, and in which an annular magnet 1 constitutes the field magnet of a magnetorotor. FIG. 4 is a plan illustration to show the positional relationships between the armature coils and the magnetorotor poles of the brushless DC motor of FIG. 3, showing the positional relationships between the field magnet 1 (annular magnet 1), armature windings L1 to L4, and position-sensing Hall generators H1 and H2.

The field magnet 1 in FIG. 3 and FIG. 4 is permanently magnetized with magnetic fields which are generally aligned with the direction of the rotor shaft 3 of the magnetorotor (as viewed in the drawings, the field magnet 1 is magnetized such that there are six poles). The field magnet 1 is fixedly attached to a yoke 4, which is formed of a highly magnetically permeable material. The yoke 4 is fixedly attached to the rotor shaft 3. In addition, a magnet 5 for generating a magnetic field for a speed sensing generator (frequency generator) is also attached to the yoke 4. The field generating magnet 5 of the speed sensing generator is permanently magnetized in a fixed magnet pattern, and as the motor rotor rotates, a speed sensing signal is generated, as an AC signal whose frequency varies in accordance with the speed of rotation of the magnetorotor, by a magnetic sensor mounted on a baseplate 7, which is mounted on the stator base 6 of the motor. The armature windings L1 to L4 are fixedly mounted on the stator base 6, as also are two Hall generators H1 and H2, and a bearing 8 for the magnetorotor shaft 3. The bearing 8 is formed of a bearing holder 8a, a radial bearing 8b, and a thrust bearing 8c.

As shown in FIG. 4 each of the armature windings L1 to L4 includes two radially extending portions, a representative one of which is indicated by the hatched-line portion $L_T$. In the motor example shown, the field magnet has six poles, indicated as N, S,..., so that the angular pitch P between successively adjacent poles is 360°/6, i.e. 60°, and the effective torque-generating portions $L_T$ of the armature windings are positioned at equidistant angular intervals of P/2, i.e. 30°.

In FIG. 2, the portion of the circuit which is associated with transistor X1 corresponds to the portion indicated as the adder A in the torque generation block diagram of FIG. 1. Resistor R1 corresponds to the voltage sensing section denoted by R in FIG. 1, which serves to convert the motor drive current I into a current-sensing voltage Vi. The remaining portions of the circuit of FIG. 2, other than the armature windings L1 to L4 and the blocks A and R, correspond to blocks G, $\phi$ and T' and A' in the torque block diagram of FIG. 1.

The Hall generators H1 and H2 are disposed mutually separated by an electrical angle of 90°, and produce output signals to indicate the current position of the magnetorotor with respect to the armature windings, by sensing the magnetic flux from the poles of field magnet 1 of the magnetorotor. The resistors R4, R5 and R6, R7 respectively determine a suitable level of DC bias current for the Hall generators H1 and H2. The output signals from the Hall generators H1 and H2 are of approximately trapezoidal waveform, and vary in proportion to the magnetic flux distribution of the field magnet 1 of the magnetorotor, as the magnetorotor rotates. The output voltages from the Hall generators H1 and H2 are respectively separated by an electrical angle of 90°, i.e. differ in phase by 90°.

The bases of transistors X3, X4 and X5, X6, which constitute four differential switching amplifiers, are respectively connected to the voltage terminals of the Hall generators H1 and H2, whereby The collector currents of the transistors X3, X4, X5 and X6 are sequentially switched in accordance with the output voltages from the Hall generators H1 and H2. As a result, the transistors X7, X8, X9 and X10, having the bases thereof respectively connected to the collectors of transistors X3, X4, X5 and X6, are sequentially switched on and off. In this way, switching control is implemented of the motor drive currents (stator currents), designated as I1 to I4, which flow through the armature windings L1, L2, L3 and L4 respectively, these windings being respectively connected to the collectors of transistors X7, X8, X9 and X10. Rotational torque is thereby generated by the motor.

Transistor X2 supplies current to the emitters of the four differential switching amplifier transistors X3 to X6, with the level of this current being determined by resistors R2 and R3. A transistor X1 serves to detect the difference between the torque control voltage Vt applied to an input terminal 2 and a current sensing voltage Vi which is developed across the current sensing resistor R1 which constitutes the voltage sensor R. The current sensing voltage Vi thereby produced by R1 is proportional to the sum I of the currents I1, I2, I3 and I4 within the armature windings L1 to L4 respectively, i.e. $I = I1 + I2 + I3 + I4$.

The collector current of transistors X2 is thus made to vary in proportion to the voltage difference (Vt − Vi) that is thus derived by the adder A, i.e. the total current which flows through the four differential switching amplifiers is made proportional to that voltage difference.

The portion of FIG. 1 comprising the blocks A, G, and R is connected as a closed-loop negative feedback system. Assuming that the gain of the portion of the circuit of FIG. 2 that corresponds to block G in FIG. 1 is sufficiently high, then the loop gain of this feedback system is given as $I = Vt/R1$. In this way, the motor drive current is made proportional to the torque command voltage Vt.

A current feedback type of brushless DC motor of the form described above with reference to FIGS. 1 and 2 has the advantage that the motor characteristics are relatively unaffected by the effects of long-term drift or ambient temperature variations upon the characteristics of the Hall generators or the drive transistors. This is a significant advantage over brushless DC motors of the type in which the output voltage from the Hall generators is directly amplified to be converted into armature winding current.

With a brushless DC motor of the form shown in FIG. 3, the magnetorotor is made up of a vertically oriented rotor shaft 3, which is supported to be freely rotatable on a bearing 8, a yoke 4 which is fixedly attached to the rotor shaft 3, a field magnet 1 (annular magnet 1) which is fixedly attached to the yoke 4, a magnet 5 fixedly attached to the yoke 4, for generating a magnetic field in a speed sensing signal generator. The motor further consists of a stator made up of a base 6, armature windings L1 to L4 which are fixedly mounted on the base 6, a baseplate 7, position-sensing Hall elements H1 and H2, etc.

With a prior art current feedback type of brushless DC motor such as that described above, the product of the effective magnetic flux produced by field magnet 1 of the magnetorotor which is magnetically linked with the armature windings L1 to L4 and the current which flows in the armature windings L1 to L4 is constant with respect to time. However torque ripple is produced as the motor rotates. The mechanism whereby torque ripple is generated will now be described, for the prior art 6-pole brushless DC motor discussed above. FIG. 5 shows the variation with time of the average amount of magnetic flux linkage between the magnetic flux produced by the magnetorotor and the respective torque generating portions $L_T$ the armature windings L1 to L4, under the condition that the magnetorotor is rotating with a constant value of torque control voltage applied. The respective values of linkage flux for each of the pairs of torque-generating portions $L_T$ of each of the four armature windings L1 to L4 are respectively denoted as $\phi1$, $\phi1$, $\phi3$ and $\phi4$. The linkage magnetic flux is plotted along the vertical axis and the angle of rotation of the magnetorotor (expressed as an electrical angle) is plotted along the horizontal axis. The values plotted along the vertical axis have been normalized to a maximum value of 1, and this has also been done for the relationships shown in FIGS. 6 to 8 described hereinafter.

As shown, the variation with time of the average amount of linkage flux between the field magnet 1 of the magnetorotor and the torque generating portions $L_T$ of the armature windings L1 to L4, has a generally sinusoidal waveform. This waveform is determined, broadly speaking, by the shape of the armature windings L1 to L4 and by the angular width of torque-generating portion $L_T$ of each armature winding, as measured about the axis of rotation.

The magnetization pattern of the field magnet 1 is close to magnetic saturation, other than in portions of that pattern which are close to the boundaries between the magnetic poles. The magnetic flux close to the central region of each pole, is oriented vertically at the surface of the field magnet 1 (i.e. extending generally along the axis of rotation), so that the pattern of magnetic flux distribution is approximately trapezoidal. However at portions of the magnetic flux which are displaced from the surface of the field magnet, the orientation of the magnetic flux at positions close to the boundaries between magnetic poles is not vertical with respect to the surface of the field magnet 1. As shown in FIG. 3, the armature windings L1 to L4 are disposed with a fixed separation from the surface of the field magnet 1 of the magnetorotor. As a result, the magnetic flux in the vicinity of the boundaries between the magnetic poles of the field magnet 1 will not be vertically linked with the armature windings L1 to L4. It is for this reason that a substantially sinusoidal variation with time occurs for the average amount of linkage flux between the magnetic flux of the field magnet 1 and the torque generating portions of the armature windings L1 to L4. In addition, the circumferential width of each of the torque generating portions of the armature windings L1 to L4 is finite, so that the amount of linkage flux of the magnetic flux of the field magnet 1 and the armature windings is, to some extent, averaged. As a result, the variation with time of the amount of linkage flux between the magnetic flux of the field magnet 1 and the torque generating portions of the armature windings L1 to L4 will have the type of sinusoidal form shown in FIG. 5.

In FIG. 5, for ease of understanding the process of torque generation, the magnetic flux polarity is indicated as a positive quantity, and only the magnetic flux polarity that results in torque generation is shown. The occurrence of linkage flux of the opposite polarity, which would be indicated as a negative quantity and does not result in torque generation, is omitted from the diagram.

FIG. 6 is a diagram to illustrate the variation with time of the average amount of flux linkage between the magnetic flux of field magnet 1 of the magnetorotor and the torque generating portions of armature windings L1 to L4, but with this variation being drawn as the variation with time of the currents I1 to I4 which respectively flow in the armature windings L1 to L4. The conduction angles and waveforms of these current flows are determined by the output voltages from the position sensing Hall generators H1 and H2 and by the operating conditions of the four differential switching amplifiers.

FIG. 7 shows the variation with time of the effective torque generated by the armature windings L1 to L4, in correspondence with the magnetic flux variations $\phi 1$ to $\phi 4$ shown in FIG. 5, and the variations in currents I1 to I4 which pass through the armature windings L1 to L4 shown in FIG. 6. In FIG. 7, the variation with time of the torques T1 to T4 which are respectively generated by armature windings L1 to L4 are shown, i.e. the torque waveforms. The above values of torque, magnetic flux and current are related as follows:

torque $T1 = \phi 1 \times I1$
torque $T2 = \phi 2 \times I2$
torque $T3 = \phi 3 \times I3$
torque $T4 = \phi 4 \times I4$ FIG. 8 shows the combined torque that is produced by the torques T1 to T4 which are generated by the armature windings L1 to L4 and are shown in FIG. 7. The level of torque ripple is produced, equal to approximately 30% of the peak value of torque, with the prior art type of 2-phase 4-input brushless DC motor described above with reference to FIGS. 1 and 2.

As can be understood from FIG. 8, since the amount of torque ripple is proportional to the stator current I, the absolute value of torque ripple will increase as the motor load increases, so that jitter, wow and flutter will be produced as the motor rotates, with the level of these being in proportion to the motor speed of rotation. These factors have a serious adverse effect upon the performance of the motor.

In order to solve the disadvantages of such prior art types of control circuit for a brushless DC motor, the present applicant has disclosed a configuration and a method of operation for a brushless DC motor, in U.S. Pat. No. 4,455,514. With the motor control circuit described in that patent, additional Hall elements are provided for producing sensing signals which are utilized to detect the level of motor torque, with these Hall generators being positioned in correspondence with the position-sensing Hall generators having the function described hereinabove. The torque sensing Hall generators are subjected to the magnetic flux of the field magnet, and in addition are supplied with currents which vary in accordance with the currents through the armature windings, for thereby generating a torque sensing signal. This torque sensing signal is employed in a negative-feedback control loop, to control the armature winding current, and hence hold the level of torque produced by the motor constant at a required value. This prior art invention fully attains the desired objectives. However since it is necessary to use a number of Hall generators for torque sensing that is equal to the number of Hall generators used for position sensing, such a brushless DC motor control circuit has the disadvantage that the configuration is complex. Improvements in this respect are therefore desirable.

SUMMARY OF THE INVENTION

A motor control circuit according to the present invention is applicable to a multiphase DC brushless motor which includes a magnetorotor having a field magnet with a plurality of magnetic poles and a plurality of armature windings, the control circuit essentially comprising a plurality of Hall generators which are fixedly positioned with respect to the armature windings for sensing the angular positions of the poles of the magnetorotor relative to the armature windings and sensing levels of magnetic flux of the magnetorotor which are coupled to the armature windings and are effective in producing rotational torque from the magnetorotor, each Hall generator having a pair of current terminals and a pair of voltage output terminals, armature winding current supply means to control the levels of currents passed through the armature windings, switching means controlled by output signals from the Hall generators for selectively enabling and interrupting the supply of current to the armature windings, means for supplying currents to the current terminals of the Hall generators in proportion to levels of current flowing through the armature windings, means for generating a torque sensing signal by rectifying output signals from each of the Hall generators and combining the resultant rectified signals, and comparator means for comparing the torque sensing signal with the torque control signal to produce a torque error signal, this torque error signal being applied by negative feedback to the means for controlling armature winding current, to thereby hold the torque produced by the motor at a constant level.

With a motor control circuit according to the present invention, each Hall generator performs both a magnetorotor pole position sensing function and a torque level sensing function, since the amplitude of current flow through each Hall generator is made proportional to armature current flow during times in which which the Hall generator is also sensing a level of field magnet flux that is linked to the armature through which the latter current is flowing, so that the amplitude of voltage produced from the voltage output terminals of the Hall generator will be proportional to the product of the latter flux and armature current, and hence proportional to the current level of motor torque. Thus, it is not necessary to provide additional Hall generators to perform torque sensing. Taking for example the case of a 2-phase DC brushless motor having four armature windings, it is only necessary to employ two Hall generators, to implement control by a circuit according to the present invention, whereas with the prior art control circuit previously disclosed by the present applicant it is necessary to employ four Hall generators.

DESCRIPTION OF THE PREFERRED EMBODIMENTS

Figure 9:
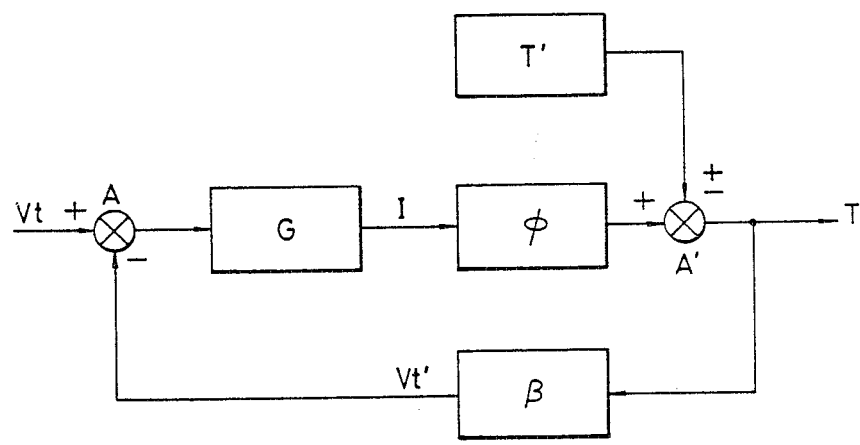
FIG. 9 is a block diagram for illustrating the process of torque generation for a brushless DC motor drive circuit according to the present invention.

FIG. 9 is a torque generation block diagram to illustrate the basic principles of a brushless DC motor control circuit according to the present invention, in which Vt denotes a torque command voltage, I denotes motor drive current (stator torque current), T denotes generated torque, A and A' denote adders (i.e. summing circuits), and G denotes an amplifier for amplifying output signals from the adder A and for converting the resultant amplified signal into a motor drive current (armature winding current I). Block $\phi$ denotes a block representing the conversion by the motor of the drive current I and the magnetic flux of the field magnet into rotational torque. $\beta$ denotes a torque sensing circuit, and T' denotes torque ripple that is generated by the motor. The torque sensing circuit $\beta$ acts to sense the motor output torque T, which includes the torque ripple T', and produces as output a torque sensing signal Vt'. In the adder A, the torque sensing signal Vt' is subtracted from the torque control voltage, and an error signal voltage is thereby produced which is input to amplifier G. A motor torque sensing negative feedback loop is constituted by the loop in which signals flow successively from adder A to amplifier G, to motor $\phi$, to adder A', to torque sensing circuit $\beta$, and back to adder A. It is a basic feature of the present invention that a signal representing the overall output torque from the motor, including the torque ripple, is fed back in this negative feedback loop. The gain of the feedback loop will be designated as $G_O$, where $G_O = 1/(G \times \phi \times \beta)$. As a result of the operation of this feedback loop, torque ripple is reduced to become $1/G_O$, and can be considered to be effectively eliminated.

Figure 3:
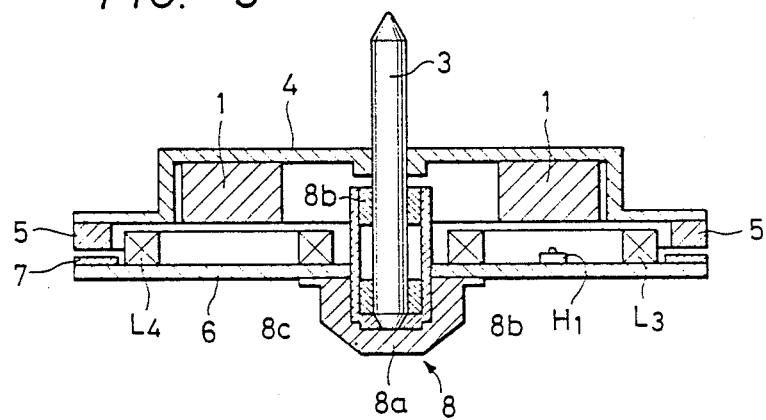
FIG. 3 is a cross-sectional view in elevation of an example of 2-phase, 6-pole brushless DC motor having four armature windings.
Figure 5:
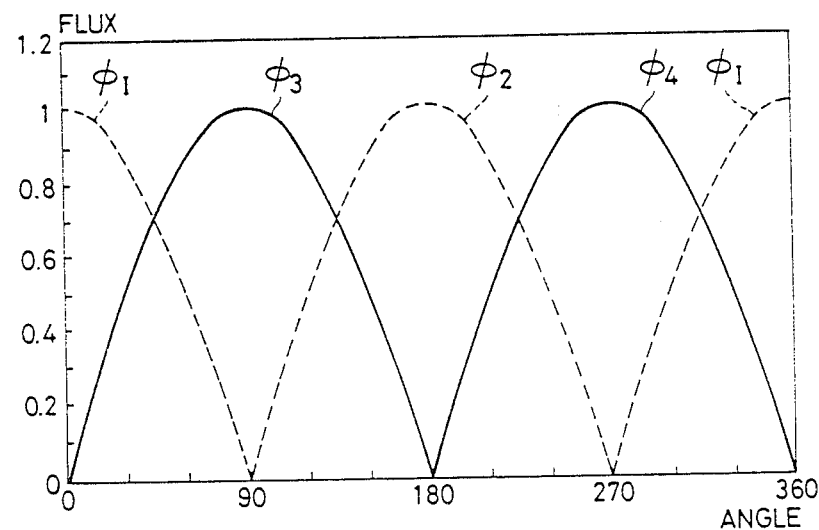
FIG. 5 is a diagram illustrating the variation of magnetic flux linkage between respective armature windings and the field magnet flux with respect to magnetorotor electrical angular position, for the brushless DC motor of FIG. 3 and FIG. 4.
Figure 6:
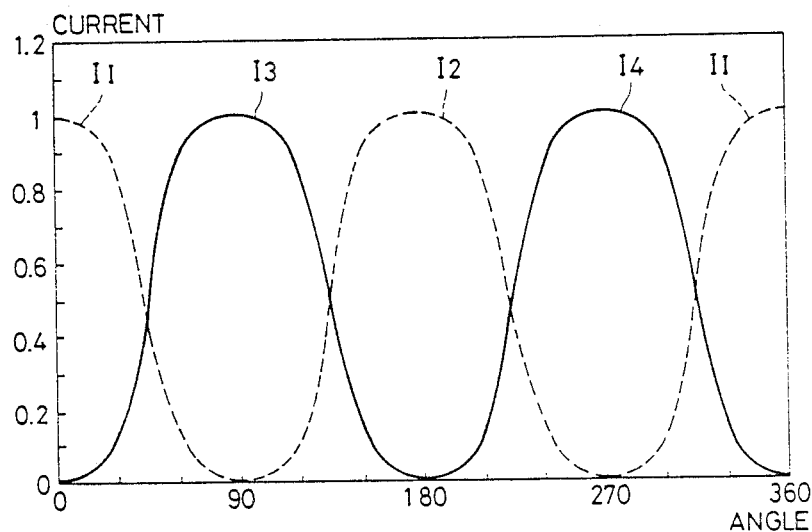
FIG. 6 is a diagram corresponding to FIG. 5, illustrating the variation of current flow in respective armature windings.
Figure 7:
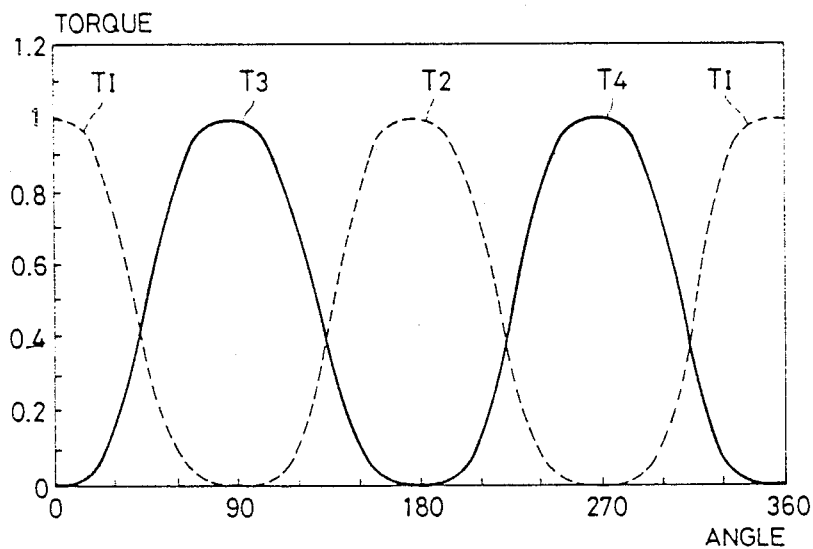
FIG. 7 is a diagram corresponding to FIG. 5, illustrating the variation of torque resulting from the respective current flows shown in FIG. 6.
Figure 8:
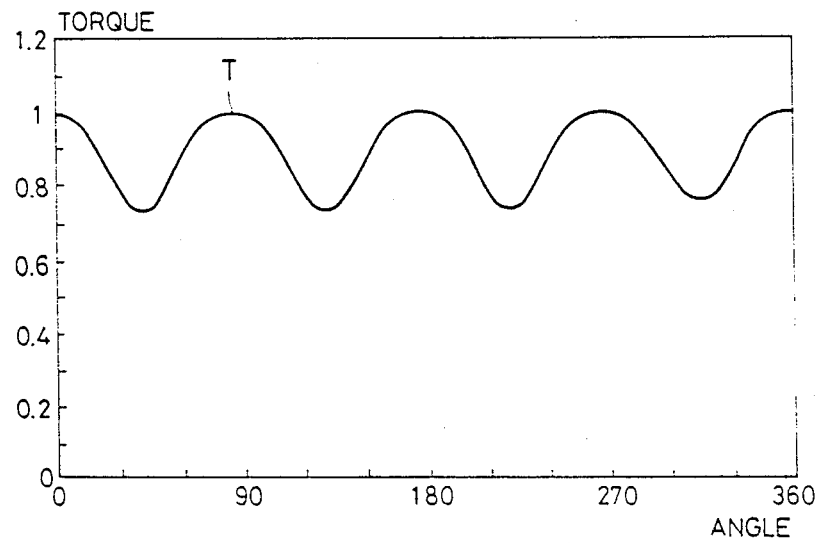
FIG. 8 is a diagram corresponding to FIG. 5, illustrating to generation of torque ripple.
Figure 10:
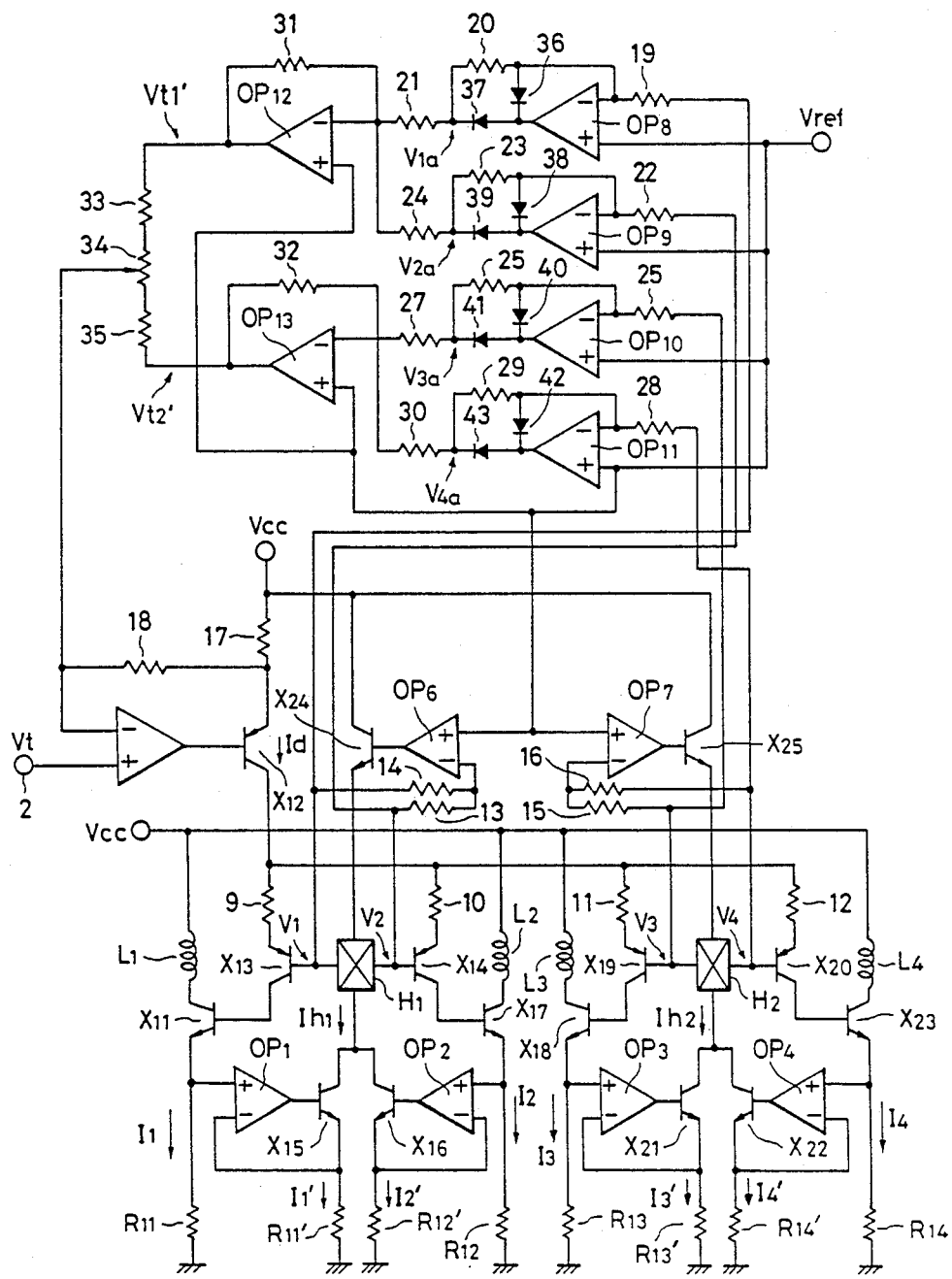
FIGS. 10, 11, 12 and 13 are circuit diagrams of embodiments of control circuits according to the present invention which are applicable to the brushless DC motor example of FIG. 3 and FIG. 4.

FIG. 10 is a circuit diagram of a first embodiment of a control circuit for a brushless DC motor according to the present invention, for controlling the DC motor shown in FIGS. 3 and 4 and described hereinabove. With a control circuit according to the present invention, the Hall generators H1 and H2 perform both position sensing and torque sensing functions.

Figure 1:
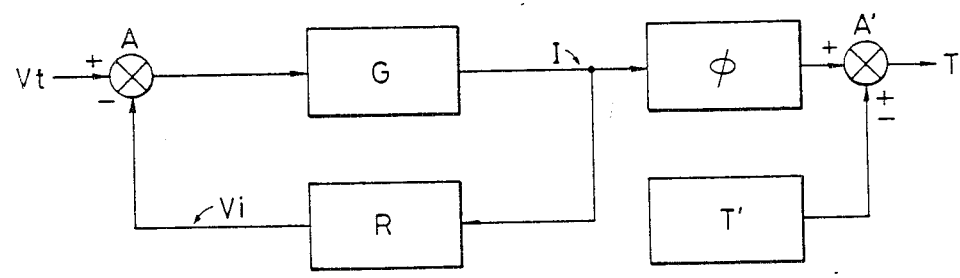
FIG. 1 is a diagram to illustrate the process of generation of torque and torque ripple, for a prior art type of brushless DC motor control circuit.
Figure 2:
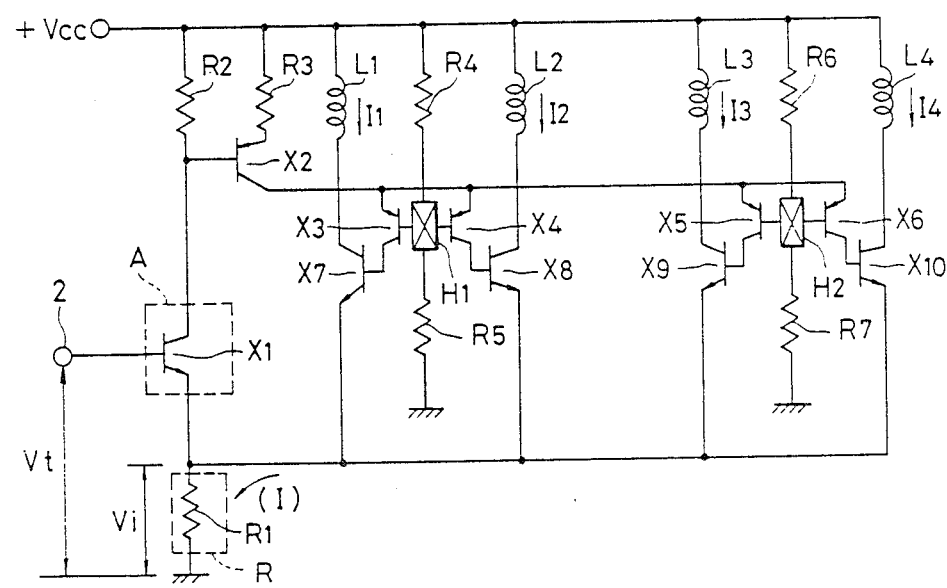
FIG. 2 is a circuit diagram of a prior art type of brushless DC motor control circuit, for a 2-phase brushless DC motor having four armature windings.

The portion of the brushless DC motor control circuit shown in FIG. 10 consisting of the Hall generators H1 and H2, transistors X11 through X14, X17 through X20, X23, armature windings L1 to L4, etc corresponds to the portion of the prior art brushless DC motor control circuit example of FIG. 2 which is made up of the Hall elements H1 and H2, transistors X1 through X10, and the armature windings L1 to L4. The resistors R11, R12, R13 and R14 in the embodiment of FIG. 10, shown connected between the emitter and ground potential for each of the drive transistors X11, X17, X18, X23, respectively, and which are coupled to the armature windings L1 to L4 respectively, are voltage sensing resistors utilized to sense the armature winding currents which flow through the respective armature windings L1 to L4. The armature windings L1 to L4 are respectively connected between the collectors of transistors X11, X17, X18 and X23 respectively and the power supply potential Vcc.

The non-inverting input terminal of a first operational amplifier OP1 is connected to the junction of the emitter of transistor X11 and the resistor R11. The non-inverting input terminal of a second operational amplifier OP2 is connected to the junction between the emitter of of transistor X17 and a resistor R12, and the non-inverting input terminal of a third operational amplifier OP3 is connected to the junction between the emitter of of transistor X18 and a resistor R13, while the non-inverting input terminal of a fourth operational amplifier OP4 is connected to the junction between the emitter of transistor X23 and a resistor R14. The output terminals of the first, second, third and fourth operational amplifiers OP1, OP2, OP3 and OP4 are respectively connected to the bases of transistors X15, X16, X21 and X22. The collectors of transistors X15 and X16 are connected to one of the current input terminals of the Hall generator H1, while the other current terminal of Hall generator H1 is connected to the emitter of transistor X24. The collector of transistor X24 is connected to the Vcc power supply potential. The emitter of transistor X15 is connected to the inverting input terminal of the first operational amplifier OP1 and also is connected through a resistor R11' to ground potential. The emitter of transistor X16 is connected to the inverting input terminal of second operational amplifier OP2, and also is connected through a resistor R12' to ground potential.

The collectors of transistors X21 and X22 are connected to one of the current input terminals of the Hall generator H2, while the other current terminal of Hall generator H2 is connected to the emitter of transistor X25. The collector of transistor X25 is connected to the Vcc power supply potential. The emitter of transistor X21 is connected to the inverting input terminal of the third operational amplifier OP3 and also is connected through a resistor R13' to ground potential. The emitter of transistor X22 is connected to the inverting input terminal of fourth operational amplifier OP4, and also is connected through a resistor R14' to ground potential.

One of the voltage output terminals of Hall generator H1 is connected to the base of transistor X13, while the collector of transistor X13 is connected to the base of the drive transistor X11. The emitter of transistor X13 is connected through resistor R9 to the collector of transistor X12, and is also connected through resistors 10, 11 and 12 to the emitters of transistors X14, X19 and X20, respectively. The other voltage output terminal of Hall generator H1 is connected to the base of transistor X14, while the collector of transistor X14 is connected to the base of drive transistor X17. A control current $I_d$, produced as described hereinafter based on a torque error signal, is supplied through resistors 9 to 12 respectively to the emitters of transistors X13, X14, X19 and X20. It will be understood that the circuits based on transistor pairs X11, X13 and X14 and X17 respectively constitute differential switching amplifiers, which are respectively controlled by the output voltage signals V1 and V2 from the voltage terminals of Hall generator H1 to selectively switch a portion of current $I_d$ through either transistor X13 of X14, and thereby produce a current flow through either amplifier transistor X11 or X17 and hence through armature winding L1 or L2, with the amplitude of this armature winding current being controlled by the level of the control current $I_d$, supplied from transistor X12. Similarly, a pair of differential switching amplifiers formed by transistors X19, X18 and X20, X23 serve to switch a controlled level of current through either armature coil L4 or L3.

The circuit composed of operational amplifier OP6 with resistors 13 and 14 connected from the voltage output terminals of Hall generator H1, and transistor X24, functions as a voltage source which is coupled to one current terminal of Hall generator H1 and acts to hold the median voltage level about which the output signals from the voltage terminals of Hall generator H1 vary in polarity, at a level equal to the reference potential $V_{ref}$. A similar function is performed by operational amplifier OP7 and transistor X25 for Hall generator H2.

A sensing voltage produced across resistor R11 due to current flow I1 through armature coil L1 is compared with a sensing voltage developed across resistor R11' due to current flow Ih1 through the current terminals of Hall generator H1 (while current is switched through transistor X13), by a comparator consituted by operational amplifier OP1. The error voltage produced from OP1 from this comparison is applied to transistor X15 such as to reduce the error, and hence to hold the current flow through the current terminals of Hall generator H1 at a value which is proportional to the current flow through armature winding L1. A similar Hall generator current control function is performed by the circuits constituted by operational amplifiers OP2, OP3 and OP4 with transistors X16, X21 and X22 respectively. Each of these circuits thus functions as a feedback circuit for producing a flow of current through a Hall generator which is accurately proportional to a level of current flow through a corresponding armature winding, i.e. an armature winding whose flux linkage is sensed by that Hall generator.

More specifically, armature winding current I1 flows in a path in the sequence [power supply potential Vcc, to armature winding L1, to drive transistor X11, to current sensing resistor R11]. Thus, a voltage drop $Vc=(R11\times I1)$ is produced across the current sensing resistor R11, which is proportional to the armature winding coil I1. During such a period of I1 current flow, armature winding current I2 is cut off.

One of the current terminals of Hall generator H1 is connected to the collector of transistor X15. The current I11' in transistor X15 flows through a path from the collector to the emitter of that transistor, through resistor R11', then to ground. A voltage drop $Ve=(R11'\times I1')$ is thereby developed across resistor R11'.

As stated above, the non-inverting input terminal of operational amplifier OP1 is connected to the emitter of transistor X11, while the inverting input terminal of that operational amplifier is connected to the emitter of transistor X15, and the output terminal of operational amplifier OP1 is connected to the base of transistor X15. Due to the operation of the circuit formed by transistor X15, current sensing resistor R11, and resistor R11', the emitter potential Vc of drive transistors X11 is made identical to the emitter potential Ve of transistor X15, whereby the current I1' that flows through resistor R11', during an interval in which armature winding current I1 flows in armature winding L1, can be expressed as follows:

$$I1'=(I1\times R11)/R11'$$

Thus, current I1' is proportional to the armature winding current I1 which flows in armature winding L1. Similarly, the current I2' that flows through resistor R12' during an interval in which armature winding current I2 flows in armature winding L2 can be expressed as follows:

$$I2'=(I2\times R12)/R12'$$

This current I2 is therefore proportional to the armature winding current I2 which flows in armature winding L2. Similarly, the current I3' that flows through resistor R13' during an interval in which armature winding current I3 flows in armature winding L3 can be expressed as follows:

$$I3' = (I3 \times R13)/R13'$$

Thus, this current I3 is therefore proportional to the armature winding current I3 which flows in armature winding L3. In the same way, the current I4' that flows through resistor R14' during an interval in which armature winding current I4 flows in armature winding L4 can be expressed as follows:

$$I4' = (I4 \times R14)/R14'$$

so that current I4 is proportional to the armature winding current I4 which flows in armature winding L4.

The current Ih1 which flows between the current terminals of the Hall generator H1 is the sum of the currents I1' and I2', i.e. $Ih1 = (I1' + I2')$. Similarly, the current which flows between the current terminals of the Hall element H2 is the sum of the currents I3' and I4', i.e. $Ih2 = (I3' + I4')$. As a result, the currents which respectively flow through the Hall generators H2 and H2 are proportional to the respective armature winding currents which are controlled by switching in response to output voltages produced from the voltage terminals of these elements.

The circuit formed of an operational amplifier OP8, having resistor 19 connected to the inverting input terminal thereof, and resistors 19 and 20, with diodes 36, 37, etc, constitutes a linear detection circuit, which is utilized as a half-wave rectifier circuit. Similarly, the circuit formed of an operational amplifier OP9, having resistor 22 connected to the inverting input terminal thereof, and resistors 22, 23 and diodes 38, 39, etc, constitutes a linear detection circuit, as does the circuit formed of an operational amplifier OP10, having resistor 25 connected to the inverting input terminal thereof, and resistors 25, 26 and diodes 40, 41 etc, and the circuit formed of an eleventh operational amplifier OP11, having resistor 28 connected to the inverting input terminal thereof, and resistors 28, 29 and diodes 42, 43, etc. Each of these linear detection circuits operates by full-wave rectification, relative to the reference potential $V_{ref}$ which is applied to the non-inverting input terminal of each of the corresponding operational amplifiers OP8 to OP11. These linear detection circuits respectively receive the output voltage signals V1, V2, V3 and V4 from the voltage output terminals of Hall generators H1 and H2, applied through resistors 19, 22, 25 and 28 respectively, and produce corresponding half-wave rectified signal outputs designated as $V_{1a}$, $V_{2a}$, $V_{3a}$ and $V_{4a}$ in FIG. 10. Signals $V_{1a}$ and $V_{2a}$ are combined in a voltage summing circuit made up of an operational amplifier OP12 and resistors 21, 24 and 31, so that the circuit formed by operational amplifiers OP12, OP8 and OP9 with their associated resistors constitutes a full-wave rectifier circuit. Similarly, a full-wave rectifier circuit is formed by operational amplifiers OP13, OP10 and OP11 and their associated resistors, in which signals $V_{3a}$ and $V_{4a}$ are produced and combined. The output signals from these full-wave rectifier circuits respectively constitute torque sensing signals Vt1' and Vt2'. That is to say, while current flow through an armature winding is taking place, the instantaneous level of current flow through the corresponding Hall generator is made proportional to the instantaneous level of armature current flow. In addition, that Hall generator is at the same time being subjected to a level of magnetic flux corresponding to the amount of flux from the field magnet which is linked with the latter armature winding at that time, and which is effective in producing torque. As a result, the corresponding instantaneous value of output voltage from the corresponding voltage terminal of that Hall generator is proportional to the product of the sensed magnetic flux and the current level flowing through the Hall generator, and hence is proportional to the instantaneous level of torque generated at that time. In this way, the sum of signals Vt1' and Vt2' constitutes a torque sensing signal Vt', whose amplitude at any point in time represents the level of torque which is currently being produced by the rotor of the motor. Signals Vt2' and Vt1' are summed in a voltage summing circuit made up of resistors 33 and 35 coupled to opposite ends of a potentiometer 34. The slider terminal of potentiometer 34 is connected to the non-inverting input terminal of the fifth operational amplifier OP5, which serves as a comparator. Potentiometer 34 is provided to enable adjustment to compensate for the effects in differences between the sensitivities of Hall generator H1 and H2. A combined torque sensing signal, Vt', is thereby effectively input to operational amplifier OP5 to be subtracted from the torque command signal Vt. An output signal is thereby produced from operational amplifier OP5, i.e. a torque error signal, representing the difference between the torque command voltage and the torque sensing signal level, and this torque error signal is applied to the base of a transistor X12. The emitter of transistor X12 is connected to the Vcc supply potential through a resistor 17, and to the inverting input of operational amplifier OP5 through a resistor 18, so that transistor X12 in conjunction with operational amplifier OP5 constitutes a current source which serves as means for controlling the level of current which is supplied to each of the armature windings L1 to L4, this current being designated as $I_d$ in FIG. 10. In this embodiment, the latter current source is coupled to control the level of current supplied to all of the armature windings L1 to L4.

Thus as described above, a summed torque sensing signal Vt', equivalent to the sum of output signals Vt1' and Vt2' produced from operational amplifiers OP12 and OP13, is applied to the inverting input terminal of operational amplifier OP5, while the torque command voltage Vt is applied to the non-inverting input terminal of OP5. In the following, it will be assumed that of the circuit components connected to the emitter and collector of transistors X12 shown in FIG. 10, whose base is coupled to receive the output signal from the fifth operational amplifier OP5, the resistance of resistor 17 will be denoted as $r_e$, while that of resistor 18 will be denoted as $r_1$, and the total amount of resistance connected between each of the outputs of operational amplifiers OP12 and OP13 and the inverting input of operational amplifier OP5, respectively, will be designated as $r_2$ and $r_3$. A current $I_d$ will be supplied to the emitters of the transistors X13, X14, X19 and X20 forming the four differential amplifiers, where:

$$I_d = [\{Vt + (Vt - Vt1')r_1/r_2\} + (Vt - Vt2')r_1/r_3]/r_e$$

Resistors 9 to 12 which are connected in series with the emitters of transistors X13, X14, X19 and X20 respectively are provided for adjustment of the armature winding current waveform.

Summarizing the above, with the brushless DC motor control circuit embodiment of FIG. 10, currents proportional to the armature winding currents I1 to I4 that respectively flow in the armature windings L1 to L4 are caused to flow through the current terminals of the position-sensing Hall generators which are respectively associated with the pairs of armature windings L1, L2 and L3, L4. Torque sensing signals are generated from signals produced between the voltage output terminals of the Hall generators, which are rectified, and the rectified signals summed to produce a torque sensing signal which is applied to control the armature winding current supply circuit, by negative feedback. In this way, a constant level of rotational torque is produced by the motor.

The Hall excitation voltage V1 that appears at one of the voltage terminals of Hall element H1 and the Hall excitation voltage V2 that appears at the other voltage output terminal of Hall element H1 are mutually opposite in-phase. Similarly, the Hall excitation voltages V3 and V4 that respectively appear at the voltage output terminals of Hall generator H2 are mutually opposite in phase. In addition, the Hall excitation voltage produced from the voltage output terminals of H1 differs in phase by 90° from the Hall excitation voltage produced from the voltage output terminals of H2. Switching control of the stator current I1 of armature winding L1 is performed in accordance with the Hall excitation voltage V1 which is produced at one voltage output terminal of Hall generator H1. Similarly, switching control of the stator current I2 of armature winding L2 is performed in accordance with the Hall excitation voltage V2 which is produced at the other voltage output terminal of Hall generator H1, so that when current is flowing in one of the armature windings L1 and L2, current flow in the other armature winding is cut off. For example, during an interval in which the Hall excitation voltage V1 from one voltage output terminal of H1 is negative, transistor X13 is set in the conducting state, whereby transistor X11 is made to conduct, so that stator current I1 flows through armature winding L1. During this time interval, the other Hall excitation voltage V2 generated at the other voltage terminal of Hall generator H1 will be positive, so that both transistor X14 and drive transistor X17 are held in the cut-off state. Similarly, during an interval in which the Hall excitation voltage voltages V1 and V2 produced at the voltage output terminals of Hall generator H1 are of opposite polarities to those described in the preceding paragraph, transistors X13 and X11 will be cut-off, and transistors X14 and X17 conducting, so that armature winding current I2 will flow in armature winding L2. In a similar way, the Hall excitation voltages V3 and V4 which are produced at the voltage output terminals of Hall generator H2 act to control switching of the armature winding currents I3 and I4 of armature windings L3 and L4 respectively.

Switching of the armature winding currents of armature windings L1 to L4 is performed by a set of four differential switching amplifiers, for example the circuit constituted by transistor X13, having resistor 9 coupled from the emitter thereof to receive current $I_d$ from transistor X12, and transistor X11, having resistors R11 connected to the emitter thereof. With the latter differential switching amplifier, transistor X13 transfers a part of current $I_d$ to the base of transistor X11 when voltage V1 becomes negative, whereby a current flows through armature winding L1 having an amplitude which is determined by the level of current $I_d$, and hence is determined by the torque error signal produced from comparator OP5. In a similar way, corresponding differential switching amplifiers based on transistor pairs X14 and X17, X19 and X18, and X20 and X23, respectively act to switch currents through armature coils L2, L3 and L4 respectively in response to Hall generator output signal voltages V2, V3 and V4 respectively, with the level of armature current flow in each case being determined by the level of current $I_d$ from transistor X12.

With the circuit of FIG. 10, Hall excitation voltages are produced at the voltage output terminals of Hall generator H1, which correspond to the product of the magnetic flux and current. Referring to the waveforms shown in FIG. 14, a Hall excitation voltage V1 appears at one of the voltage output terminals of Hall generator H1, which corresponds to the product of the current I1' (which is proportional to the armature winding I1 flowing in armature winding L1) and the linkage magnetic flux $\phi 1$ (i.e. the amount of linkage magnetic flux which is coupled from field magnet 1 to armature winding L1 and is effective in generating torque). This voltage V1 can be considered as data which expresses the rotational torque produced by the motor. Similarly, a Hall excitation voltage V2 appears at the other voltage output terminal of Hall generator H1, which corresponds to the product of the current I2' (which is proportional to the armature winding I12 flowing in armature winding L2) and the linkage magnetic flux $\phi 2$ (i.e. the amount of linkage magnetic flux which is coupled to armature winding L2 that is effective in generating torque). This voltage V2 can also be considered as data which expresses the rotational torque produced by the motor.

In a similar way, (although not shown in FIG. 14), $\phi 3$ and $\phi 4$ denote the amounts of magnetic flux that are effective in generating torque, and are applied from the field magnet of the magnetorotor to the Hall generator H2, and the Hall excitation voltages which appear at the output terminals of Hall generator H2 correspond to the product of the effective linkage magnetic flux and the current which flows through armature windings L3 and L4. Specifically, a Hall excitation voltage V3 appears at one of the voltage terminals of Hall generator H2, which corresponds to the product of the current I3' and the linkage magnetic flux $\phi 3$, and this voltage V3 can be considered as data which expresses the rotational torque produced by the motor. Similarly, a Hall excitation voltage V4 appears at the other voltage output terminal of Hall generator H2, which corresponds to the product of the current I4' and the linkage magnetic flux $\phi 4$, so that voltage V4 also constitutes data representing the rotational torque produced by the motor.

The circuit portion made up of transistor X24, coupled between one current terminal of Hall generator H1 and the Vcc supply potential, the operational amplifier 6, and resistors 13 and 14, serves to maintain the potential midway between the Hall excitation voltages V1 and V2 of H1 at a value which is equal to the reference potential $V_{ref}$. Similarly, the circuit portion made up of transistor X25, coupled between one current terminal of Hall generator H2 and the Vcc supply potential, the operational amplifier 7, and resistors 15 and 16, serves to maintain the potential midway between the Hall excitation voltages V3 and V4 of H2 at a value which is equal to the reference potential $V_{ref}$.

Figure 14:
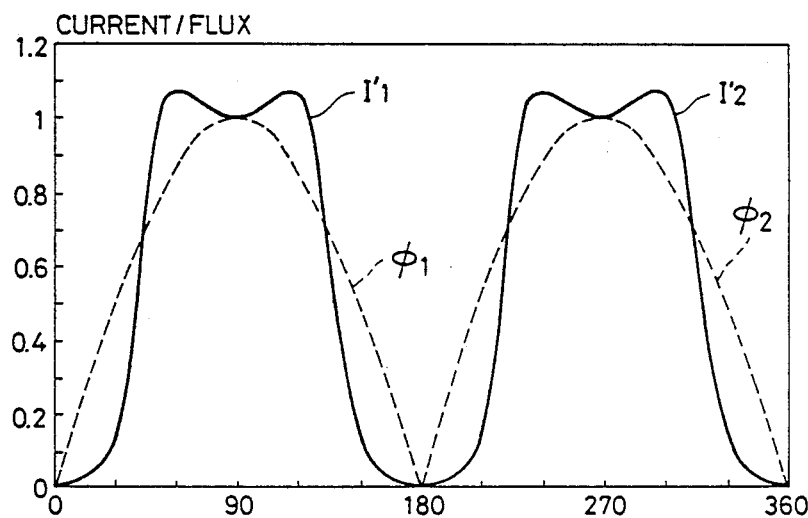
FIG. 14 is a diagram illustrating the variation of magnetic flux linkage between the field magnet poles and the armature windings, with respect to magnetorotor electrical angular position, for two opposing armature windings of the brushless DC motor example of FIG. 3, and the corresponding flows of Hall generator current which are proportional to armature winding current, for the motor control circuit embodiment of FIG. 10.

FIG. 14 shows the relationship between the position of the magnetorotor (expressed as an electrical angle) and the currents I1' to I4' (represented by currents I1' and I2') which flow between the current terminals of the Hall generators H1 and H2, these currents being proportional to the currents I1 to I4 which flow in the armature windings L1 to L4 respectively. FIG. 14 also shows the corresponding variation of the levels of magnetic flux $\phi 1$ to $\phi 4$ (represented in FIG. 14 by $\phi 1$ and $\phi 2$) of the field magnet of the magnetorotor which are linked to the torque-generating portions of the armature windings, as sensed by Hall generators H1 and H2.

As is clear from FIG. 14, the currents I1' and I2' differ in phase by 180° (while the currents I3' and I4' also differ in phase by 180°). Thus, the Hall excitation voltage generated by Hall generator H1 in accordance with the product of the current I1' and the magnetic flux $\phi 1$ (or the Hall excitation voltage generated by Hall generator H1 in accordance with the product of current I2' and the magnetic flux $\phi 2$) represents the instantaneous value of torque being generated as a result of that armature winding current. This is also true for the Hall excitation voltage generated by Hall generator H2 in accordance with the product of current I3' and magnetic flux $\phi 3$, and the Hall excitation voltage generated by H2 in accordance with the product of current I4' and magnetic flux $\phi 4$.

Taking for example the excitation voltage V1 generated by Hall generator H1, during an interval in which the armature winding current I1 flows through armature winding L1, $V1 < V_{ref}$, while during an interval in which armature winding current I2 flows in armature winding L2, the Hall excitation voltage $V2 < V_{ref}$. Similarly, during an interval in which armature winding current I3 flows in armature winding L3, the Hall excitation voltage V3 from Hall generator H2 will be in the condition $V3 < V_{ref}$, and during an interval in which armature winding current I4 flows in armature winding L4, the Hall excitation voltage $V4 < V_{ref}$.

Figure 15:
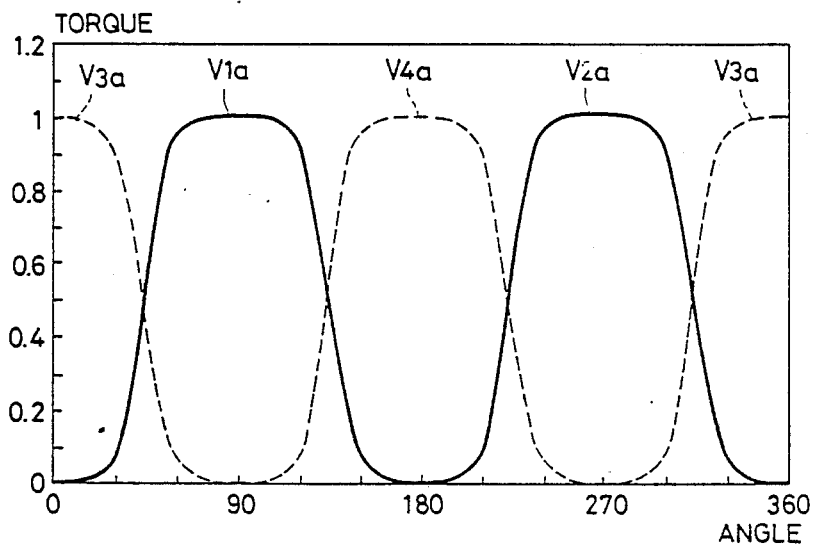
FIG. 15 is a diagram illustrating the variation of output sensing voltages from each Hall generator voltage output terminal after full-wave rectification, with respect to electrical angular position of the magnetorotor, for the motor control circuit embodiment of FIG. 10.

Thus, each negative-going half-wave of each of the voltages derived by rectification of the Hall excitation voltages V1 to V4, i.e. the voltages V1a, V2a, V3a and V4a which vary with magnetorotor (electrical) angular position as shown in FIG. 15, will respectively express the torque which is generated by the respective armature windings L1 to L4.

Figure 16:
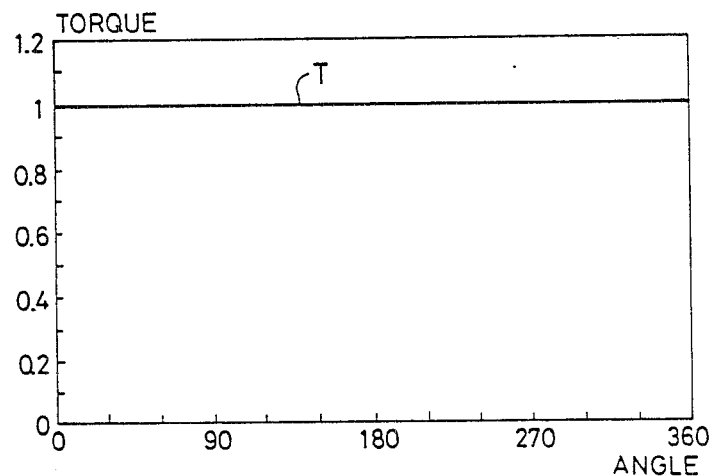
FIG. 16 is a diagram illustrating the variation of motor torque with respect to magnetorotor electrical angular position, for the motor control circuit embodiment of FIG. 10)

Thus, the sum signal Va which is produced by summing V1a, V2a, V3a and V4a shown in FIG. 15 in the adder (i.e. $Va = V1a + V2a + V3a + V4a$) is employed as the torque sensing signal Vt', which is applied to control the armature winding current supply circuits by negative feedback. As a result, the rotational torque T of the motor is held constant, as shown in FIG. 16, with no torque ripple being produced.

With a brushless DC motor control circuit according to the present invention, no increase in torque ripple will result due to variations in the conduction angles of the armature winding currents which flow in the armature windings, due to causes such as deviations in the base-emitter voltages of the transistors which form the four differential amplifiers.

In the above description it has been assumed that the magnetic flux of the field magnet magnetic field varies in a sinusoidal manner with time. However the present invention is also applicable to a brushless DC motor control circuit employing a field magnet whose magnetic flux varies with (electrical) angular position relative to a fixed point in a manner which is other than sinusoidal.

Figure 11:
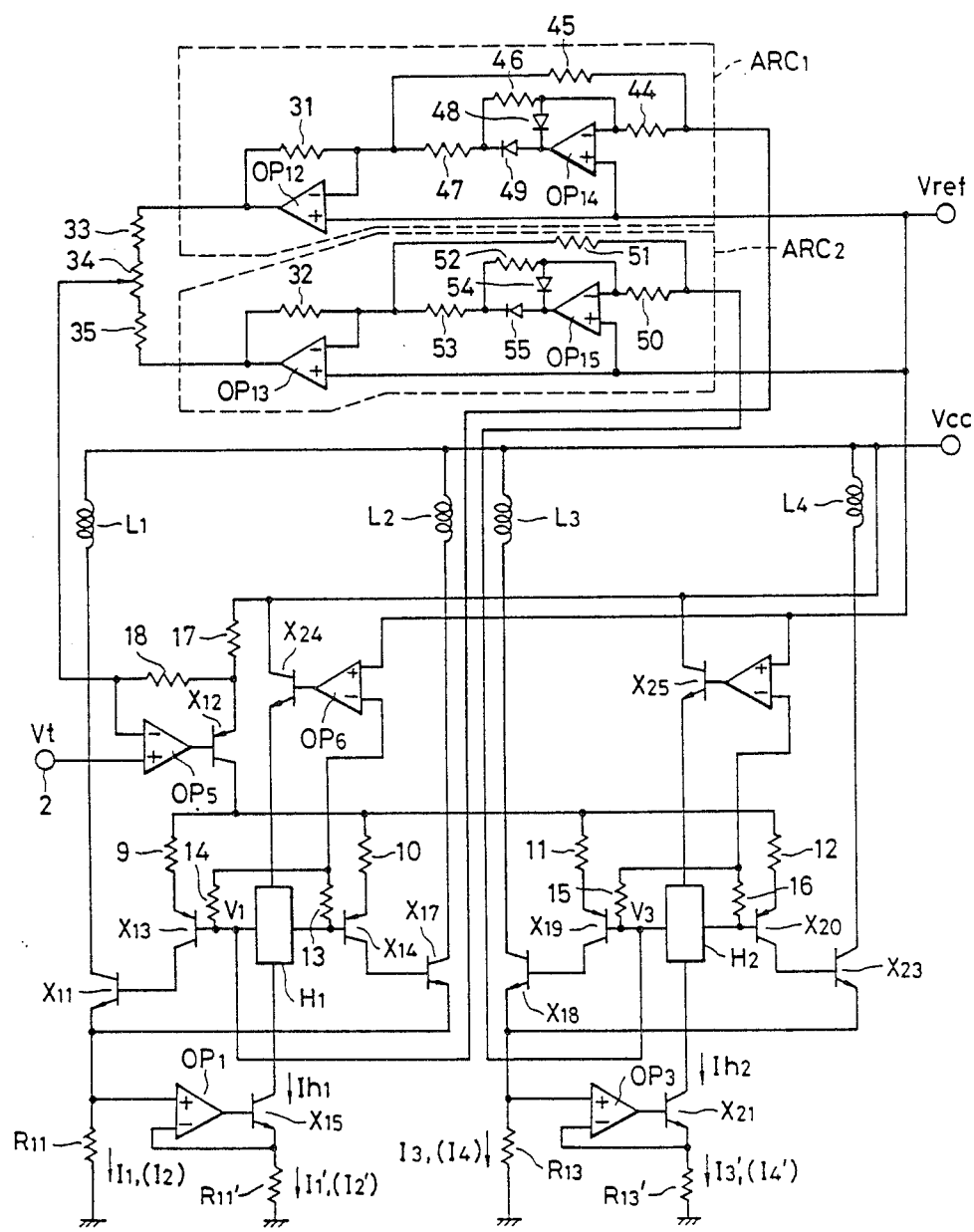

In the 4-input 2-phase brushless DC motor control circuit embodiment of FIG. 10, separate circuits are provided for sensing the currents which flow in armature windings L1 to L4 respectively when driven by the drive transistors X11, X17, X18, and X23 respectively, with currents I1' to I4' being caused to flow through the current terminals of the Hall generators H1 and H2 in proportion to the armature winding currents I1 to I4 respectively which flow through armature windings L1 to L4 respectively, and with Hall excitation voltages V1 to V4 being thereby generated at the voltage output terminals of Hall generators H1 and H2 in correspondence with the motor torque. However the currents which flow in the two armature windings L1 and L2, controlled by ON/OFF switching in response to the Hall excitation voltages generated at the voltage output terminals of Hall generator H1, do not mutually overlap with respect to the time axis. Similarly, the currents which flow in the two armature windings L3 and L4, controlled by ON/OFF switching in response to the Hall excitation voltages generated at the voltage output terminals of Hall generator H2, do not mutually overlap with respect to the time axis. Based on this fact, it is possible to modify the circuit used to sense the armature winding currents I1 to I4, to the form shown in FIG. 11, which shows a second embodiment of a brushless DC motor control circuit according to the present invention, for a two-phase motor having the configuration shown in FIGS. 3 and 4. In the embodiment of FIG. 11, as in the previous embodiment, only two Hall generators are employed. Currents I1' and I2' flow through the current terminals of Hall generator H1 which are proportional to the currents I1 and I2 flowing in armature windings L1 and 12 respectively, driven by drive transistors X11 and X17 respectively. Similarly, for Hall generator H2, currents I3' and I4' flow through the current terminals which are proportional to the currents I3 and I4 flowing in armature windings L3 and L4 respectively, driven by drive transistors X18 and X23 respectively. As a result, Hall excitation voltages V1 and V2 are generated at the voltage terminals of Hall generators H1 and H2 in the embodiment of FIG. 11 which correspond to the excitation voltages V1 and V2 of the embodiment of FIG. 10 described above.

The brushless DC motor control circuit embodiment of FIG. 11 differs from that of FIG. 10 in that the second operational amplifier OP2, transistors x16, resistors R12, R12', the fourth operational amplifier OP4 and transistors X22, resistors R14, and R14' of the embodiment of FIG. 10 are eliminated. In addition, the emitters of transistors X11 and X17 are connected in common, and the emitters of drive transistors X18 and X23 are connected in common. Furthermore, the four full-wave rectifier circuits which are employed as linear detection circuits in the embodiment of FIG. 10 are replaced by two full-wave rectifier circuits ARC1 and ARC2 in the embodiment of FIG. 11. In the embodiment of FIG. 11, use is made of the fact that the armature winding currents I1 and I2 (I3 and I4) which are controlled by ON/OFF switching based on the Hall excitation voltages appearing at the voltage output terminals of Hall element H1(H2) do not mutually overlap along the time axis, which allows a single current sensing resistor R11 (R13) to perform sensing of both the armature winding currents I1 and I2 (I3 and I4). Furthermore, in the case of the circuits which derive the currents I1' and I2' (I3' and I4') in proportion to the armature winding currents I1 and I2 (I3 and I4), the circuit formed of first operational amplifier OP1, transistor X15, and resistors R111, R11' (in the case of Hall generator H2 the circuit formed of operational amplifier OP3, transistor X21 and resistors R13, R13') has the function of generating both of currents I1' and I2', where I1' is proportional to armature winding current I1 during current flow through L1 and is proportional to current I2 during current flow through L2.

As stated above, the armature winding currents I1 and I2 (I3 and I4) which are controlled by switching based on the Hall excitation voltages produced at the voltage output terminals of Hall generators H1 and H2 do not mutually overlap along the time axis, and this fact is also utilized as follows. Taking for example one of the Hall excitation voltages V1 and V2 (V3 and V4), e.g. voltage V1, generated at one of the two voltage output terminals of Hall generator H1, then each interval in which V1 is negative corresponds to an interval in which the armature winding current I1 flows in armature winding L1. On the other hand, during an interval in which the Hall excitation voltage V1 is positive (i.e. an interval in which V2 is negative), armature winding current I2 flows in armature winding L2 in response to Hall excitation voltage V2. Thus, by performing full-wave rectification of the Hall excitation voltage V1 which is produced from a single one of the two voltage output terminals of Hall generator H1, by means of a full-wave rectifier circuit ARC1, (the circuit formed of operational amplifiers OP14 and OP12, resistors 31, 44 to 47, and diodes 48 and 49 in FIG. 11), a signal is output from ARC1 which corresponds to the torque that is generated in response to the current I1 (I2) which flows in armature winding L1 (L2). Similarly, by performing full-wave rectification of the Hall excitation voltage V3 which is produced from one of the voltage output terminals of Hall generator H2 in full-wave rectifier circuit ARC2 (the circuit formed of operational amplifiers OP15 and OP13, resistors 32, 50 to 53, and diodes 54 and 55 in FIG. 11), a signal is output from ARC2 which corresponds to the torque that is generated in response to the current I3 (I4) which flows in armature winding L3 (L4). These torque sensing signals from full-wave rectifier circuits ARC1 and ARC2 are summed and input to operational amplifier OP5, to be compared with the torque command voltage Vt, as in the previously described embodiment, to produce a constant level of rotational torque.

Figure 12:
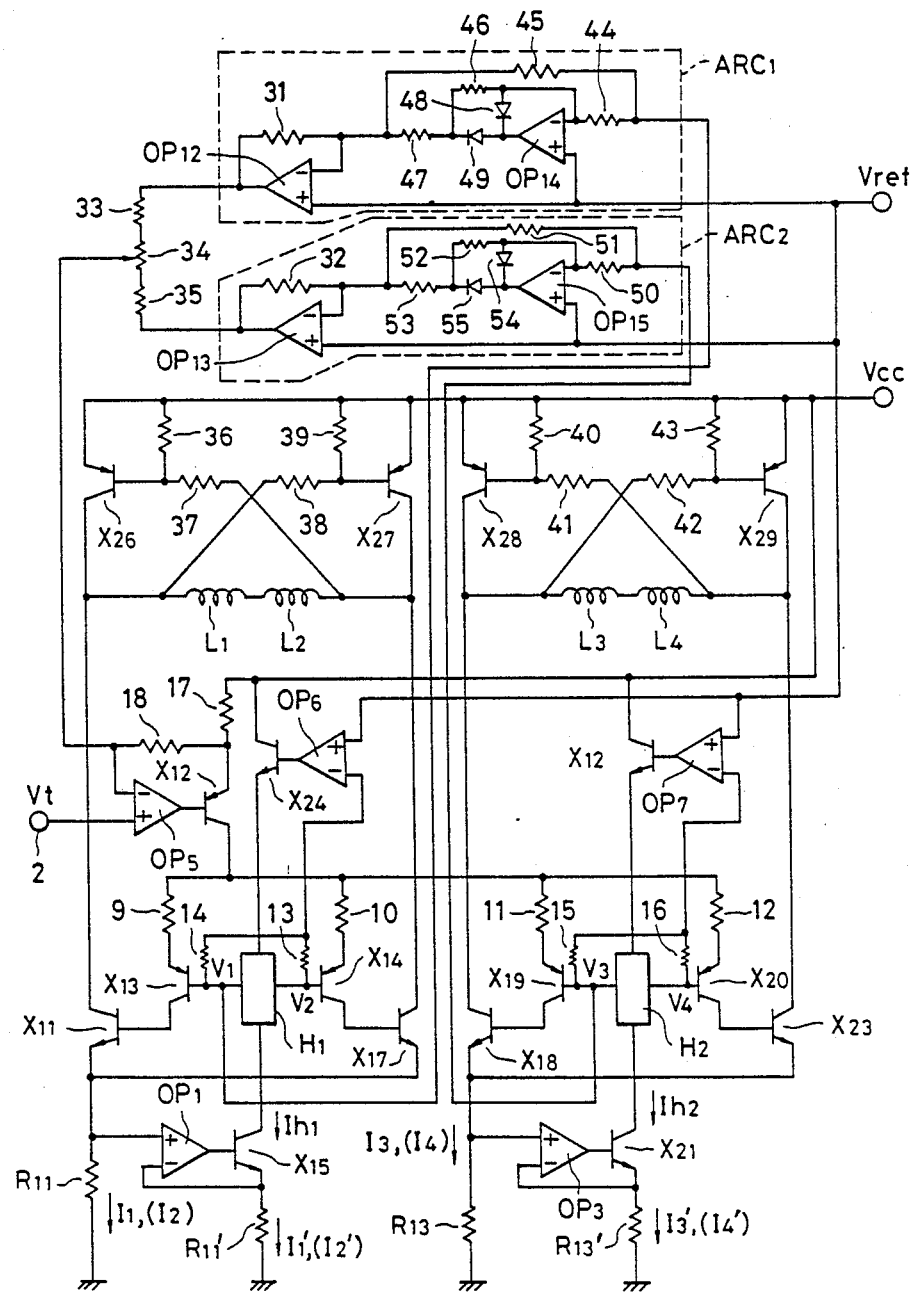

In the motor control circuit embodiments of FIG. 10 and FIG. 11, only unidirectional current flow occurs through the armature windings L1 to L4. In FIG. 12, another embodiment of a brushless DC motor control circuit according to the present invention is shown, in which bidirectional current flow occurs in the armature windings L1 to L4, and which differs from the embodiment of FIG. 11 in that drive transistors X26 to X29 and resistors 36 to 43 have been added. In the embodiment of FIG. 12, the transistors X26 to X29 are of opposite conduction types to the drive transistors X11, X17, X18 and X23.

The motor control circuit embodiment of FIG. 12 will be described by taking for example the Hall excitation voltage V1 (V3), of the Hall excitation voltages V1 and V2 (V3 and V4) produced at the two voltage terminals of Hall generator H1 (H2). When voltage V1 (V3) is positive, i.e. when Hall excitation voltage V2 (V4) is negative, transistors X27 and X11 (X28 and X23) will be set in the conducting state, and the drive transistors X27 and X11 (X29 and X18) are in the cut-off state. As a result, current flows through armature windings L1 and L2 (L3, L4) along a path from the Vcc power supply potential, from the emitter to the collector of drive transistor 26 (drive transistors X28), through armature windings L1, L2 (L3, L4), from the collector to the emitter of drive transistors X17 (X23), to current sensing resistor 11 (current sensing resistor 13), and hence to ground potential. Conversely, when Hall excitation voltage V2 (V4) of the Hall excitation voltages V1 and V2 (V3 and V4) generated at the voltage output terminals of Hall excitation voltages H1 (H2) is positive, and Hall excitation voltage V1 (V3) is negative, then the transistors X17 and X26 (X28 and X23) are set in the cut-off state, while the drive transistors 27 and 11 (29 and 18) are set in the conducting state. As a result, current flows through armature windings L2 and L1 (L4 and L3) along a path from the Vcc power supply potential, from the emitter to the collector of drive transistor 27, (drive transistors 29) through armature windings L2, L1 (L4, L3)), from the collector to the emitter of drive transistors X11 (drive transistor X18), to current sensing resistor 11 (current sensing resistor 13), and hence to ground potential. The direction in which current is passed through respective armature windings of each pair of armature winding in this way, e.g. L1 and L2, is such that magnetic fields of mutually opposite polarity are produced by the respective armature windings of each pair. As a result, for example while torque is being exerted by attraction force acting between armature coil L1 and one pole of the magnetorotor, additional torque in the same direction will be produced by repulsion force acting between armature coil L1 and another pole of the magnetorotor. In this way, increased torque is generated through bidirectional stator current flow in the embodiment of FIG. 12, by comparison with the unidirectional current flow which is employed in the embodiments of FIG. 10 and 11.

Figure 13:
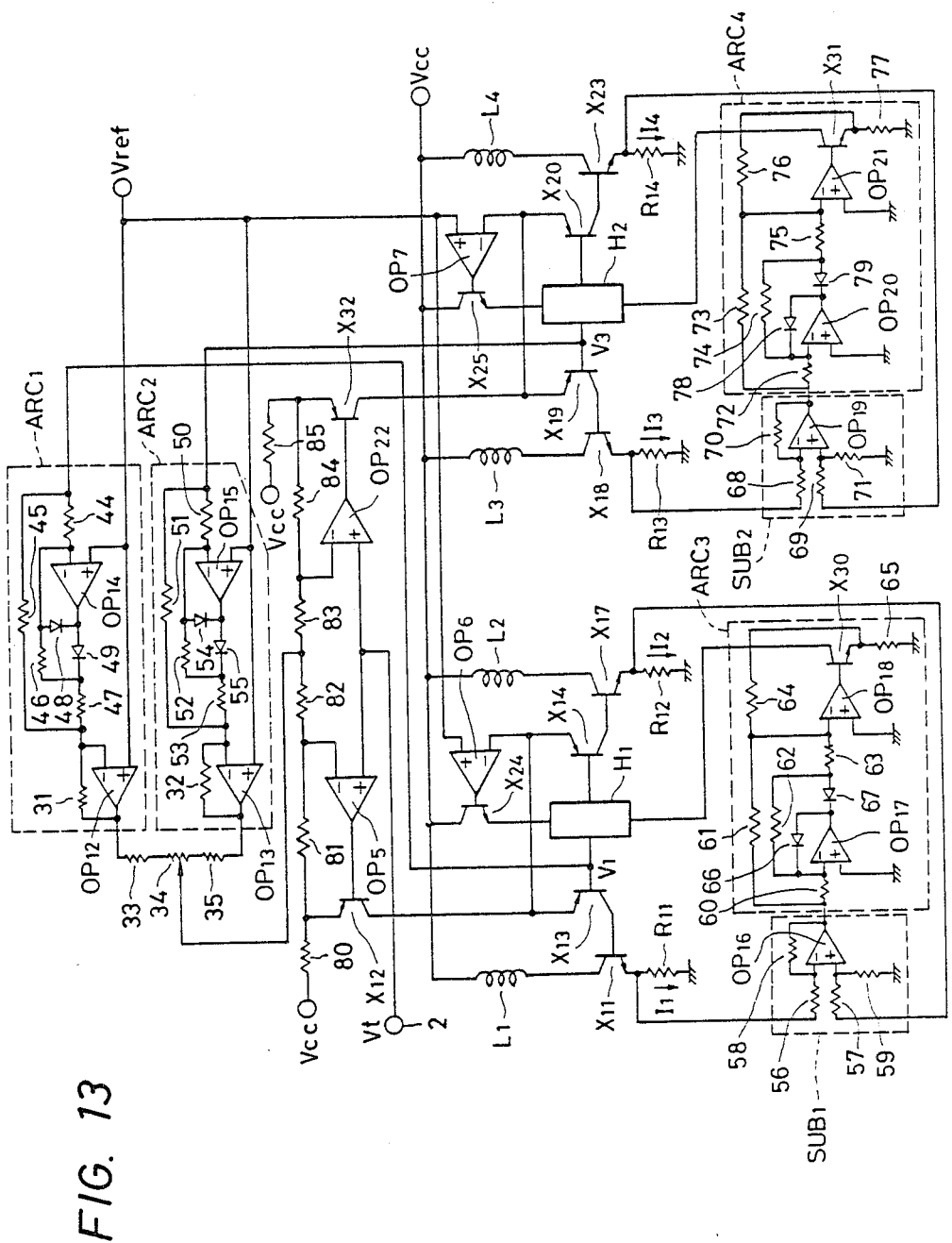

The brushless DC motor control circuit embodiments described above with reference to FIGS. 10 to 12 are each of 4-input 2-phase type, i.e. a single armature current control circuit (based on transistor X12) supplies control current to four differential switching amplifiers. FIG. 13 shows another embodiment of a brushless DC motor control circuit according to the present invention, which is of 2-input 2-phase configuration, i.e. in which separate current control circuits, based on transistors X12 and X32, respectively supply control current to two pairs of differential switching amplifiers. Furthermore, in the above embodiments it is assumed that no overlap occurs between the currents which respectively flow in the armature coils of each of the pairs of coils L1, L2 and L3, L4. However if such time overlap of current flow should occur, then the respective torque-producing forces resulting from the respective overlapping current flows in a pair of armature windings of one phase of the motor (e.g. L1 and L2) will mutually cancel, so that no output torque will result. In such a case, accurate sensing of motor torque will not be accurately achieved by the embodiments of the invention described above. With the embodiment of FIG. 13, therefore, the current through each Hall generator is held proportional to the difference between the currents which flow in the corresponding pair of armature windings. In this way, no adverse effect upon torque sensing will result from time intervals in which overlapping current flows occur in each pair of armature windings. In FIG. 13, a circuit portion made up of a subtractor circuit SUB1 and a full-wave rectifier circuit ARC3 is connected to the emitter of drive transistor 11 and the emitter of drive transistor 17, and serves to produce a current flow between the current terminals of the Hall generator H1 which varies in proportion to the difference between armature winding current I1 of armature winding L1 and armature winding current I2 of armature winding L2. In addition, a circuit portion made up of a subtractor circuit SUB2 and a full-wave rectifier circuit ARC4 is connected to the emitter of drive transistor 18 and the emitter of drive transistor 23, and serves to produce a current flow between the current terminals of the Hall generator H2 which varies in proportion to the difference between armature winding current I3 of armature winding L3 and armature winding current I4 of armature winding L4.

Subtractor circuit SUB1 (SUB2) is made up of an operational amplifier OP16 and resistors 56 to 59 (in the case of SUB2, OP19 and resistors 68 to 71), and generates a voltage which corresponds to the difference between the voltage drop appearing across voltage sensing resistor R11, connected to the emitter of drive transistor X11 (this voltage drop being proportional to the armature winding current I1) and the voltage drop appearing across voltage sensing resistor R12, connected to the emitter of drive transistor X17 (this voltage drop being proportional to the armature winding current I2). The output voltage thereby produced by SUB1 (SUB2) is applied to full-wave rectifier circuit ARC3 (ARC4).

The full-wave rectifier circuit ARC3 (ARC4) is made up of operational amplifiers OP17 and OP18, resistors 60 to 65, diodes 66 and 67 and a transistor X30 (in the case of ARC4, operational amplifiers OP20, 21, resistors 72 to 77, diodes 78 and 79, and transistor X31), and performs full-wave rectification of the voltage supplied from subtractor circuit SUB1 (SUB2), and converts the resultant rectified voltage into a current by means of transistor X30 (X31). This current varies in proportion to the armature winding current I1 (I2) {I3 (I4)}, and flows between the current terminals of Hall generator H1 (H2).

Figure 17:
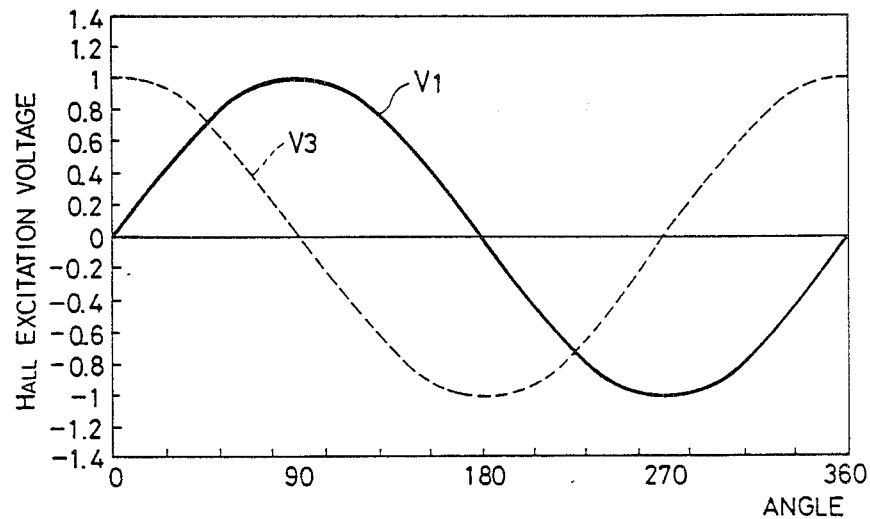
FIG. 17 is a diagram illustrating the variation of output sensing voltages from one output terminal of each of two Hall generators, with respect to magnetorotor electrical angular position, for the control circuit embodiment of FIG. 13.
Figure 18:
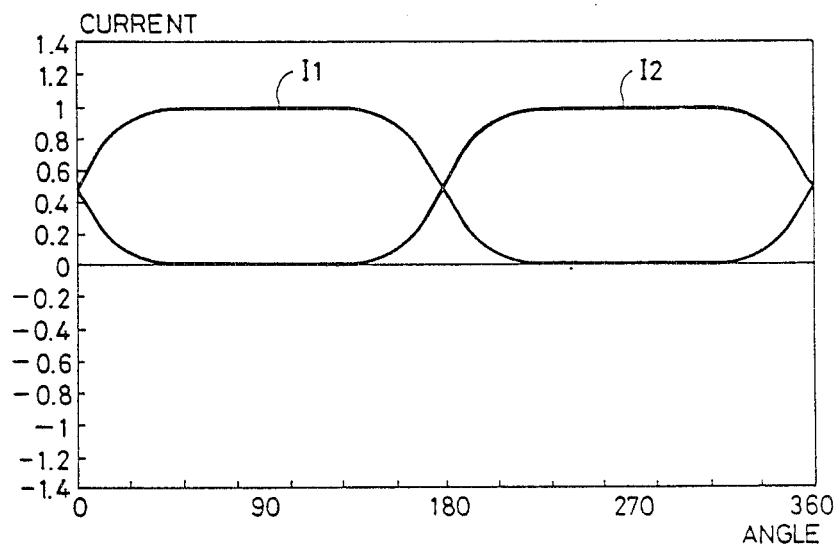
FIG. 18 and and FIG. 19 are diagrams illustrating the variation of current flow through armature windings, with respect to magnetorotor electrical angular position, for the control circuit embodiment of FIG. 13.
Figure 19:
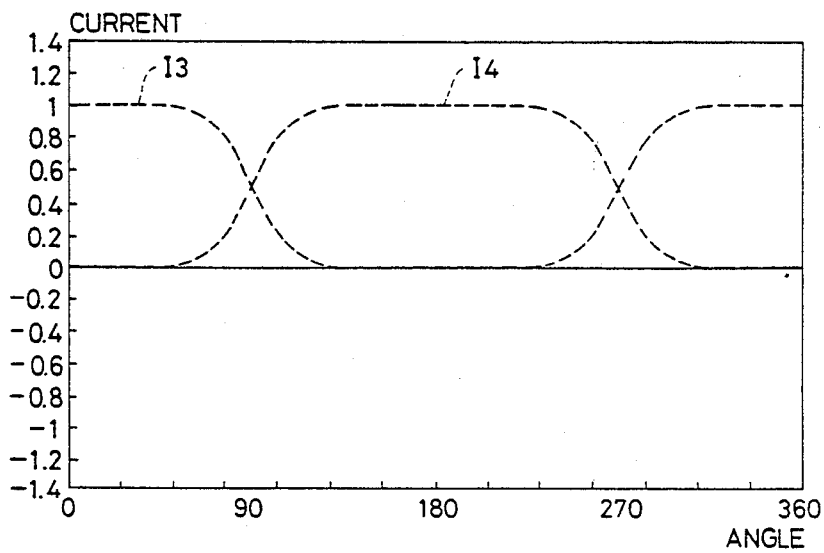
Figure 20:
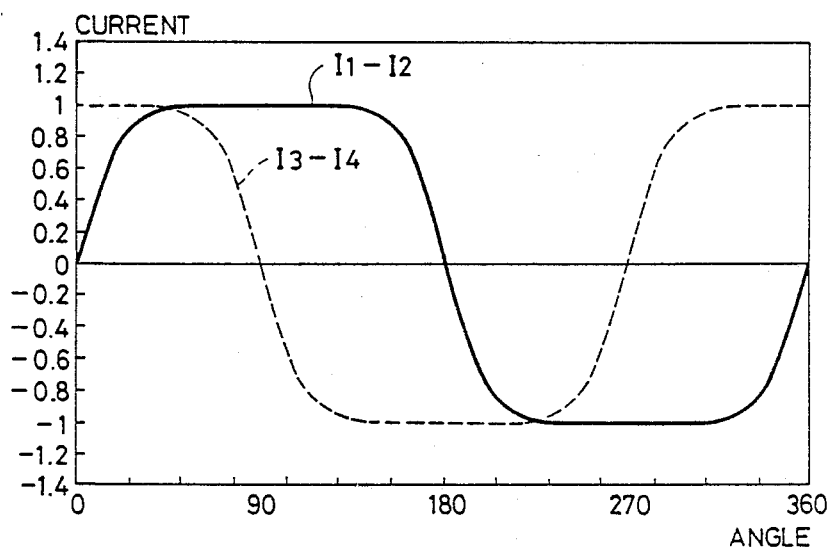
FIG. 20 is a diagram illustrating the variation of a difference between current flows through a first pair of armature windings and a difference between current flows through a second pair of armature windings, with respect to magnetorotor electrical, angular position, for the control circuit embodiment of FIG. 13.

FIG. 17 is a diagram showing the variation with magnetorotor (electrical) angular position of the Hall excitation voltage V1 from Hall generator H1 and the Hall excitation voltage V3 from Hall generator H2, for the 2-input 2-phase brushless DC motor control circuit embodiment of FIG. 13. FIG. 18 illustrates the variation with respect to changes in magnetorotor (electrical) angular position of the armature winding current I1 flowing in armature winding L1, and armature winding current I2 of armature winding L2, for the embodiment of FIG. 13, assuming that intervals of overlap between currents I1 and I2 occur, while FIG. 19 illustrates the corresponding variation of the armature winding current I3 of armature winding L3, and armature winding current I4 of armature winding L4. FIG. 20 shows the result (I1−I2) of subtraction of the armature winding current I2 from armature winding current I1, by subtractor circuit SUB1, and the result (I3−I4) of subtraction of armature winding current I3 from I4, by subtractor circuit SUB2. With the motor control circuit embodiment of FIG. 13, the armature winding currents I1 and I2 (I3 and I4) which are respectively switched by the Hall excitation voltage voltages produced at the two voltage output terminals of one of the Hall generators H1 and H2 include portions which mutually overlap along the time axis, i.e. at points in time which are close to current switching times, as shown in FIG. 18 (FIG. 19). If currents were to be supplied to the Hall generator H1 (H2) current input terminals that are proportional to the currents sensed by current sensing resistors R11 and R12 (R13 and R14), the currents thus supplied to the Hall generator would not be continuously proportional to the torque. However in the embodiment of FIG. 13, the difference between the two armature winding currents I1 and I2 (I3 and I4) are derived by means of the subtractor circuit SUB1 (SUB2) As shown in FIG. 20, the problem of overlap does not arise for this current difference (I1−I2) {(I3−I4)}, as viewed along the time axis. Thus, a current is derived which varies in proportion to the torque that is generated by the armature winding currents I1 and I2 (I3 and I4). By performing full-wave rectification of the difference signal (I1−I2) {(I3−I4)} shown in FIG. 20, a current is derived which is supplied to the current terminals of Hall generator H1 (H2) and which varies in proportion to the armature winding currents I1 and I2 (I3 and I4). In this way Hall excitation voltages are generated from the voltage output terminals of Hall generator H1 (H2) which correspond to the torque of the motor As in the embodiments of FIGS. 11 and 12 above, torque sensing signals are produced by full-wave rectifier circuits ARC1 and ARC2 from the Hall excitation voltages V1 and V3 each produced at one of the voltage output terminals of Hall generators H1 and H2 respectively, these torque sensing signals being summed and compared with the torque command voltage, to produce a torque error signals which is applied by negative feedback to the armature winding current control circuit, to thereby hold the motor torque at a constant level.

In the embodiment of FIG. 13, two comparators (OP5 and OP22) are utilized to compare the torque command voltage Vt with the torque sensing signal Vt' which is produced by combining the the output signal voltages from rectifier circuits ARC1 and ARC2. The torque error signals thus produced from comparators OP5 and OP22 are respectively applied to determine the levels of control currents supplied from transistors X12 and X32 to the switching circuits of the respective pairs of armature coils L1, L2 and L3, L4.

Figure 4:
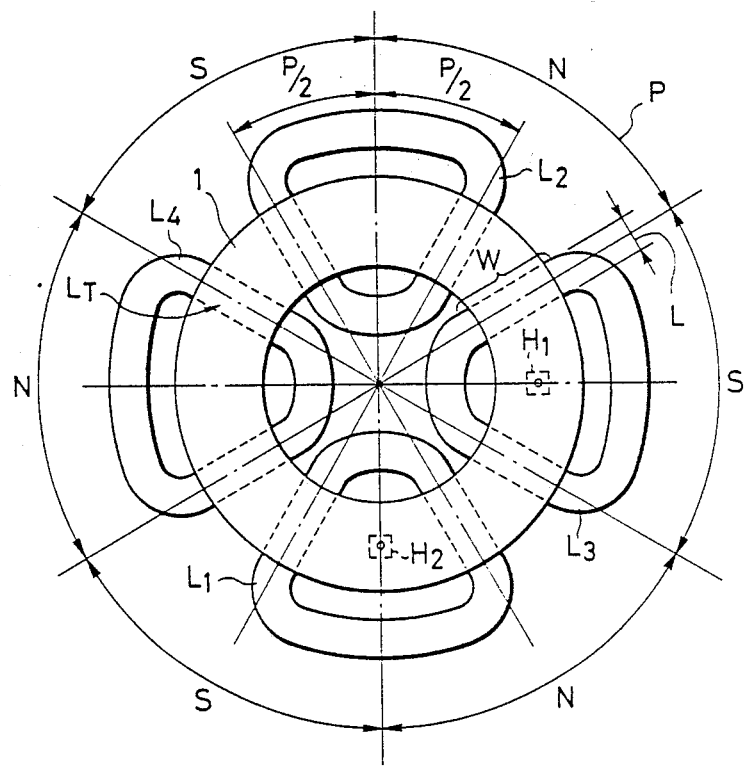
FIG. 4 is a diagram to illustrate the positional and angular dimensional relationships between the armature windings, and the field magnet poles of the brushless DC motor example of FIG. 3.
Figure 21:
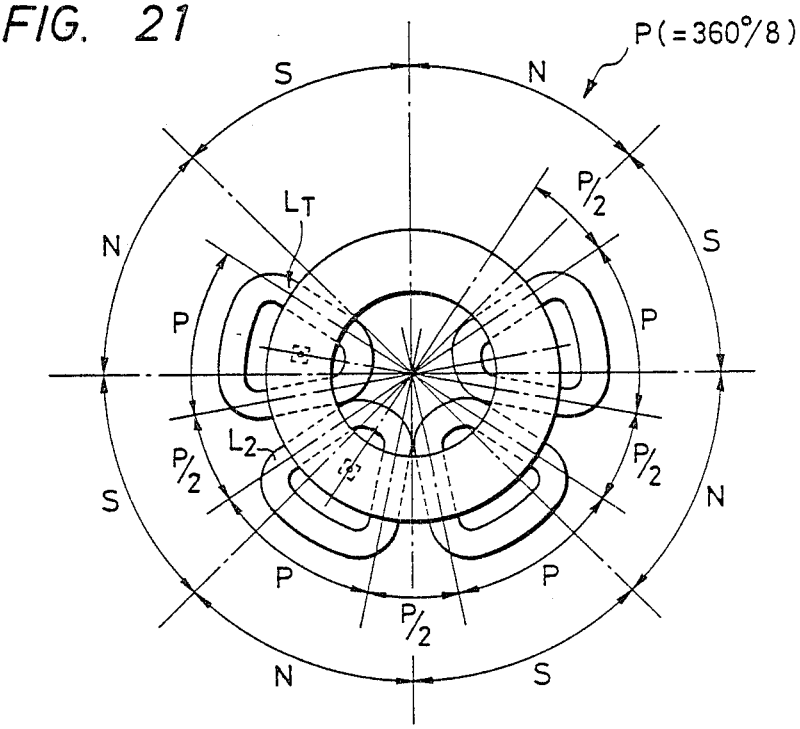
FIG. 21 and FIG. 22 are diagrams illustrating the relationships between armature windings and field magnet poles, as seen in plan view, for examples of first and second examples of 2-phase, 8-pole brushless DC motors having four armature windings, to which the motor control circuit embodiments of FIGS. 10 through 13 are applicable.

The embodiments of control circuits according to the present invention shown in FIGS. 10, 11, 12 and 13 have been described for application to the 2-phase, 6-pole DC brushless motor example of FIG. 4, which has four armature windings that are symmetrically disposed about the axis of rotation, with the angular spacings between the torque generating portions of an armature winding being equal to the pole pitch P, and in which the respective torque generating portions of adjacent pairs of armature windings are separated by an angle P/2. However the embodiments of FIGS. 10 to 13 above are also applicable to other configurations of 2-phase DC brushless motor having 4 armature windings. An example of an alternative configuration for such a motor is illustrated in FIG. 21, which shows only the relationships between the armature windings and the poles of the magnetorotor as seen in plan view. The motor of FIG. 21 is of 2-phase, 8-pole type, having four armature windings. Thus, the pole pitch P, is 360°/8, i.e. 45°. The four armature windings are disposed at different angular positions about the axis of rotation of the motor from those of the embodiment of FIG. 4. Specifically, the angular spacing between the torque generating portions of an armature winding is made equal to the pole pitch P, i.e. 45°, while the spacing between adjacent torque generating portions of a pair of armature windings is P/2, and the angular spacing between the Hall generators is 3P/2. All of the drive circuit embodiments of the present invention described hereinabove are suitable for controlling the motor example of FIG. 21.

Figure 22:
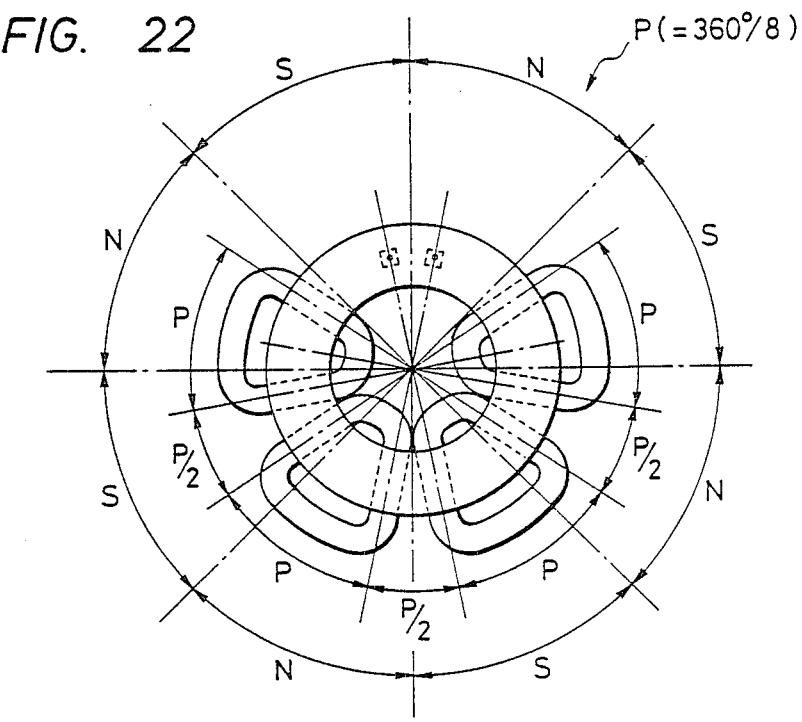

FIG. 22 shows another example of a 2-phase, 8-pole DC brushless motor having 4 armature windings, which differs from that of FIG. 21 only in that the Hall elements are positioned outside the armature windings, and that the angular spacing between the Hall generators is P/2. This motor example is also applicable to the drive circuit embodiments of the present invention described hereinabove.

Figure 23:
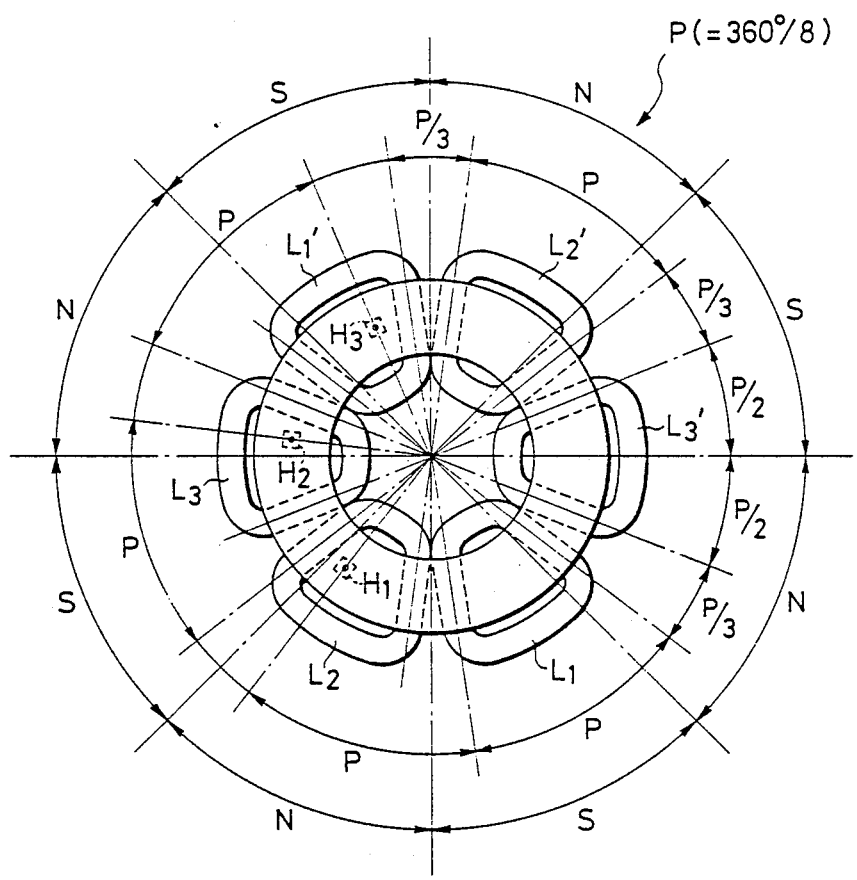
FIG. 23 is a diagram illustrating the relationships between armature windings and field magnet poles, as seen in plan view, for an example of a 3-phase, 8-pole brushless DC motor having six armature windings, to which a motor drive circuit according to the present invention is applicable.

FIG. 23 shows an example of a configuration for a 3-phase, 8-pole DC brushless motor having 6 armature windings. Three Hall generators H1, H2 and H3 are employed. When controlled by a drive circuit according to the present invention, Hall generator H1 would be employed to sense the current flows in armature windings L1 and L1', H2 senses current flows in armature windings L2 and L2', while H3 senses current flows in armature windings L3 and L3'. As shown, Hall generator H1 is disposed at an angular spacing of P/3 from one of the torque generating portions of armature winding L2 and an angular spacing of P from one of the torque generating portions of armature winding L1. Hall generator H2 is similarly positioned with respect to armature windings L3 and L2, and H3 is similarly positioned with respect to armature windings L1' and L3. It will be apparent that any of the drive circuit embodiments of the present invention described hereinabove could be easily modified to control a DC brushless motor having the configuration shown in FIG. 23, simply by adding circuit portions corresponding to the additional motor phase, i.e. to render the current flows through the additional Hall element proportional to the current flows through the corresponding armature windings, and to rectify the output sensing voltage from the additional Hall generator and combine that with the outputs from the other Hall elements to produce a torque sensing voltage Vt', as described hereinabove for the case of a 2-phase DC brushless motor. Since such modification is obvious, such a drive circuit embodiment is omitted from the drawings.

As described in the above, a motor control circuit according to the present invention is applicable to a multi-phase DC brushless motor having a magnetorotor provided with a field magnet formed with a plurality of poles of successively alternating polarity and a plurality of armature windings respectively corresponding to the motor phases. From the above description of the preferred embodiments it can be understood that with a brushless DC motor control circuit according to the present invention, a circuit configuration is employed whereby magnetorotor pole position sensing Hall generators also function as torque sensing Hall generators, so that the number of Hall generators which must be utilized is no greater than the number of elements employed in a prior art type of brushless DC motor control circuit which does not provide torque sensing. Furthermore, with the brushless DC motor control circuit which has been previously disclosed by the present applicant as described hereinabove, it is necessary to use additional Hall generators for torque sensing, equal in number to the Hall generators that are employed for position sensing. Thus, the overall configuration of a motor and a control circuit according to the present invention can be made more simple and economical to manufacture, although a fixed level of rotational torque is maintained. A brushless DC motor control circuit according to the present invention therefore represents a significant improvement over prior art types of such control circuit.

Furthermore, with a brushless DC motor control circuit according to the present invention, accurate sensing of the torque is achieved irrespective of the armature winding current waveform or the magnetization pattern of the field magnet of the magnetorotor, and it is possible to attain precisely constant output torque even if time-overlap occurs between portions of the armature current waveforms of pairs of armature windings controlled by each Hall generator.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A control circuit for controlling a multi-phase brushless DC motor to produce a constant level of torque in response to a torque control signal, the motor including a stator having a plurality of armature windings each corresponding to a specific phase of said motor and a rotor having a plurality of field magnet poles of successively alternating polarity, comprising:

a plurality of Hall generators corresponding to said motor phases, each including a pair of current terminals and a pair of voltage output terminals, positioned to sense magnetic flux linkage between said poles of said rotor and said corresponding armature windings and to product sensing output signals from said voltage output terminals;

armature winding current control means operable to control levels of current supplied to said armature windings;

switching means controlled by said output signals from said Hall generators for selectively enabling and interrupting supply of current to said armature windings at levels determined by said armature winding current control means;

a plurality of feedback control circuits each responsive to a level of current flow through an armature winding of one of said phases for supplying current to said current terminals of a Hall generator corresponding to said phase, in proportion to a level of current flow through said armature winding of said corresponding motor phase means for rectifying said output signals from each of said Hall generators and torque sensing signal generating means for summing the resultant rectified signals from respective ones of said Hall generators to produce a torque sensing signal, and;

comparator means for comparing said torque sensing signal with said torque control signal to produce a torque error signal;

said torque error signal being applied to said armature winding current control means to control said current supply levels by negative feedback, to thereby reduce variations in output torque of said motor.

2. A control circuit according to claim 1, in which said armature windings comprise a plurality of pairs of armature windings with said pairs respectively corresponding to the phases of said motor, and in which each of said Hall generators is positioned with respect to a corresponding one of said pairs of armature windings for sensing flux linkage between said pair of armature windings and said rotor magnetic poles, and in which output signals from respective ones of said voltage output terminals of each of said Hall generators act on said switching means to control the switching of current to respective ones of said pair of corresponding armature windings.

3. A control circuit according to claim 2, in which said torque sensing signal generating means comprise a plurality of full-wave rectifier circuits for respectively performing full-wave rectification of said output signals from said voltage output terminals of a corresponding one of said Hall generators to thereby produce full-wave rectification output signals, and voltage summing means for summing said full-wave rectification output signals to produce said torque sensing signal.

4. A control circuit according to claim 3, in which each of said full-wave rectifier circuits comprises a pair of half-wave rectifier circuits respectively coupled to receive output signals from said pair of voltage output terminals of said corresponding Hall generator, and circuit means for combining resultant half-wave rectified output signals from said pair of half-wave rectifier circuits.

5. A control circuit according to claim 4, in which each of said half-wave rectifier circuits comprises a linear detection circuit.

6. A control circuit according to claim 3, in which each of said full-wave rectifier circuits is coupled to receive an output signal from one of said pair of voltage output terminals of said corresponding Hall generator.

7. A control circuit according to claim 6, in which each of said full-wave rectifier circuits includes a linear detection circuit.

8. A control circuit according to claim 2, in which said armature winding current control means comprise a current source controlled by said torque error signal and coupled to said switching means to control current flows in all of said armature windings.

9. A control circuit according to claim 8, in which said switching means comprise a pair of differential switching amplifiers controlled by current supplied from said current source, each of said differential switching amplifiers comprising a first transistor having an emitter coupled to said current source and a base coupled to a corresponding one of said voltage output terminals of said Hall generator, and a second transistor of opposite conduction type to said first transistor, wherein said second transistor has a base coupled to the collector of said first transistor, a collector coupled through one of the armature windings of said corresponding pair of armature windings to a first power supply potential and an emitter coupled through a resistor to a second power supply potential.

10. A control circuit according to claim 2, in which said armature winding current control means comprises a plurality of current sources, each of said current sources being controlled by said torque error signal and respectively coupled to said switching means, for controlling levels of current flow in corresponding pairs of said armature windings.

11. A control circuit according to claim 10, in which said switching means comprise a pair of differential switching amplifiers controlled by current supplied from said current source, each of said differential switching amplifiers comprising a first transistor having a collector, an emitter coupled to a corresponding one of said current sources and a base coupled to a corresponding one of said voltage output terminals of said Hall generator, and a second transistor of opposite conduction type to said first transistor, said second transistor having a base coupled to the collector of said first transistor, a collector coupled through one of the armature windings of said corresponding pair of armature windings to a first power supply potential and an emitter coupled through a resistor to a second power supply potential.

12. A control circuit for controlling a multi-phase brushless DC motor to produce a constant level of torque in response to a torque control signal, the motor including a stator having a plurality of pairs of armature windings, said pairs of windings respectively corresponding to phases of said motor, and a rotor having a plurality of field magnet poles of successively alternating polarity, the control circuit comprising:

a plurality of Hall generators respectively corresponding to said motor phase, each including a pair of current terminals and a pair of voltage output terminals, and each positioned with respect to a corresponding one of said pairs of armature windings for sensing magnetic flux linkage between said poles and said pair of armature windings and producing sensing output signals from said voltage output terminals;

armature winding current control means operable to control levels of current supplied to said armature windings;

switching means responsive to output signals from respective ones of said voltage output terminals of each of said Hall generators for selectively enabling and interrupting a supply of current to respective ones of said pair of armature windings at levels determined by said armature winding current control means;

Hall generator current supply mean for supplying current to said current terminals of each of said Hall generators in proportion to a level of current which is effective in producing torque from said rotor and is passed through said pair of armature windings of said corresponding motor phase by said switching means in response to said output signals from said Hall generator;

means for rectifying said output signals from each of said Hall generators and torque sensing signal generating means for summing the resultant rectified signals from respective ones of said Hall generators to produce a torque sensing signal, and;

comparator means for comparing said torque sensing signal with said torque control signal to produce a torque error signal;

said Hall generator current supply means of each of said Hall generators comprising:

first and second voltage sensing resistors respectively coupled to receive currents which flow through first and second armature windings of said corresponding pair of armature windings;

first and second current control means coupled in common to one of said current terminals of said Hall generator, for respectively controlling flow of current through said Hall generator during intervals when current flows through said first armature winding and said second armature winding are respectively enasbled by said switching means;

a voltage source coupled to the other one of said current terminals of said Hall generator;

third and fourth voltage sensing resistors respectively coupled to receive current flows induced through said Hall generator current terminals by said first and second current control means respectively, and;

first comparator means for sensing a difference between sensing voltages respectively developed across said first and third voltage sensing resistors and for controlling said first current control means to reduce said difference towards zero, and second comparator means for sensing a difference between sensing voltages respectively developed across said second and fourth voltage sensing resistors and for controlling said second current control means to reduce said difference towards zero;

said torque error signal being applied to said armature winding current control means to control said current supply levels by negative feedback, to thereby reduce variations in output torque of said motor.

13. A control circuit according to claim 12, in which said first and second current control means of each of said Hall generators comprise first and second transistors having respective collectors coupled in common to a first current terminal of said Hall generator and respective emitters coupled in series with said third and fourth voltage sensing resistors, and in which said first and second comparator means comprise first and second operational amplifiers, said first operational amplifier having a non-inverting input terminal and an inverting input terminal respectively coupled to receive said sensing voltages from said first and third voltage sensing resistors respectively and an output terminal coupled to a base of said first transistor, and said second operational amplifier having a non-inverting input terminal and an inverting input terminal respectively coupled to receive said sensing voltages from said second and fourth voltage sensing resistors respectively and having an output terminal coupled to a base of said second transistor.

14. A control circuit for controlling a multi-phase brushless DC motor to produce a constant level of torque in response to a torque control singal, the motor including a stator having a plurality of pairs of armature winding, said pairs of windings respectively corresponding to phases of said motor, and a rotor having a plurality of field magnet poles of successively alternating polarity, the control circuit comprising:

a plurality of Hall generators respectively corresponding to said motor phases, each including a pair of current terminals and a pair of voltage output terminals, and each positioned with respect to a corresponding one of said pairs of armature windings for sensing magnetic flux linkage between said poles and said pair of armature windings and producing sensing output signals from said voltage output terminals;

armature winding current control menas operable to control levels of current supplied to said armature windings;

switching means responsive to output signals from respective ones of said voltage output terminals of each of said Hall generators for selectively enabling and interrupting supply of current to respective ones of said pair of armature windings at levels determined by said armature winding current control means;

Hall generator current supply means for supplying current to said current terminals of each of said Hall generators in proportion to a level of current which is effective in producing torque from said rotor and is passed through said pair of armature windings of said corresponding motor phase by said switching means in response to said output signals from said Hall generator;

means for rectifying said output signals from each of said Hall generators and torque sensing signal generating means for summing the resultant rectified signals from respective ones of said Hall generators to produce a torque sensing signal, and;

comparator means for comparing said torque sensing signal with said torque control signal to produce a torque error signal;

said Hall generator current supply means of each of said Hall generators comprising:

a first voltage sensing resistor coupled to receive currents which flow through a both a first and a second armature winding of said corresponding pair of armature windings;

current control means coupled to one of said Hall generator current terminals, for controlling current flow through said Hall generator;

a voltage source coupled to the other one of said current terminals of said Hall generator;

a second voltage sensing resistor coupled to receive currents passed through said current terminals of said Hall generator by said current control means, and;

comparator means for sensing a difference between sensing voltage respectively developed across said first and second voltage sensing resistors and for controlling said current control means to reduce said difference towards zero;

said torque error signal being applied to said armature winding current control means to control said current supply levels by negative feedback, to thereby reduced variations in output torque of said motor.

15. A control circuit according to claim 14, in which said current control means of each of said Hall generators comprises a transistor having a collector coupled to one current terminal of said Hall generator and an emitter coupled in series with said second voltage sensing resistor, and in which said comparator means comprise an operational amplifier having a non-inverting input terminal and an inverting input terminal respectively coupled to receive said sensing voltages of said first and second voltage sensing resistors.

16. A control circuit for controlling a multi-phase brushless DC motor to produce a constant level of torque in response to a torque control signal, the motor including a stator having a plurality of pairs of armature windings, said pairs of windings respectively corresponding to phases of said motor, and a rotor having a plurality of field magnet poles of successively alternating polarity, the control circuit comprising:

a plurality of Hall generators respectively corresponding to said motor phases, each including a pair of current terminals and a pair of voltage output terminals, and each positioned with respect to a corresponding one of said pairs of armature windings for sensing magnetic flux linkage between said poles and said pair of armature windings and producing sensing output signals from said voltage output terminals;

armature winding current control means operable to control levels of current supplied to said armature windings;

switching means responsive to output signals from respective ones of said voltage output terminals of each of said Hall generators for selectively enabling and interrupting supply of current to respective ones of said pair of armature windings at levels determined by said armature winding current control means;

Hall generator current supply means for supplying current to said current terminals of each of said Hall generators in proportion to a level of current which is effective in producing torque from said rotor and is passed through said pair of armature windings of said corresponding motor phase by said switching means in response to said output signals from said Hall generator;

means for rectifying said output signals from each of said Hall generators and torque sensing signal generating means for summing the resultant rectified signals from respective ones of said Hall generators to produce a torque sensing signal, and;

comparator means for comparing said torque sensing signal with said torque control signal to produce a torque error signal;

said Hall generator current supply means of each of said Hall generators comprising:

first and second voltage sensing resistors respectively coupled to receive currents which flow through first and second armature windings of said corresponding pair of armature windings;

subtractor means for subtracting a sensing voltage produced across said first voltage sensing resistor from a sensing voltage produced across said second voltage sensing resistor, to produce voltages;

full-wave resistor means for rectifying said output signal from said subtractor means with respect to a specific reference potential, to produce a control signal;

a voltage source coupled to one of said current terminals of said Hall generator, and;

current control means coupled to the other one of said current terminals of said Hall generator, for controlling current flow through said Hall generator current terminals in accordance with said control signal from said full-wave rectifier means;

said torque error signal being applied to said armature winding current control means to control said current supply levels by negative feedback, to thereby reduce variations in output torque of said motor.

17. A control circuit according to claim 16, in which said full-wave rectifier means includes a linear detection circuit and in which said current control means comprises a transistor having a collector coupled to one current terminal of said Hall generator, a resistor coupled between an emitter of said transistor and a power source potential, a base of said transistor being coupled to receive said control signal from said full-wave rectifier means.

18. A control circuit for controlling a multi-phase brushless DC motor to produce a constant level of torque in response to a torque control signal, the motor including a stator having a plurality of armature windings each corresponding to a specific phase of said motor and a rotor having a plurality of field magnet poles of successively alternating polarity, comprising, corresponding to each said phase:

a Hall generator positioned to sense magnetic flux linkage between at least one armature winding corresponding to said phase, for producing a sensing output signal in response to said sensing;

rectifying means for rectifying said sensing output signal to produce a torque sensing signal;

comparator means for comparing said torque sensing signal with said torque control signal to produce a torque error signal;

current control means for producing a controlled current at a level determined by said torque error signal;

switching means for supplying a flow of current to said armature winding at a level determined by said controlled current during time intervals controlled by said sensing output signal, and;

feedback means responsive to said armature current for producing a flow of current through said Hall generator at a level which is directly proportional to said armature current level.

* * * * *